(12) United States Patent
Miyata

(10) Patent No.: US 7,929,543 B2
(45) Date of Patent: Apr. 19, 2011

(54) PACKET FORWARDING APPARATUS HAVING GATEWAY LOAD DISTRIBUTION FUNCTION

(75) Inventor: Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 908 days.

(21) Appl. No.: 11/766,327

(22) Filed: Jun. 21, 2007

(65) Prior Publication Data
US 2008/0101396 A1    May 1, 2008

(30) Foreign Application Priority Data

Oct. 31, 2006  (JP) ................................. 2006-295020

(51) Int. Cl.
H04L 12/56   (2006.01)
(52) U.S. Cl. .................... 370/395.21; 370/428; 370/230
(58) Field of Classification Search .................. 370/352, 370/386, 462, 389, 432, 390, 393, 401, 338, 370/235, 395.21, 428, 230
See application file for complete search history.

(56) References Cited

U.S. PATENT DOCUMENTS

| | | | |
|---|---|---|---|
| 5,649,103 A * | 7/1997 | Datta et al. ..................... | 709/203 |
| 5,974,452 A | 10/1999 | Karapetkov et al. | |
| 6,219,706 B1 | 4/2001 | Fan et al. | |
| 6,366,576 B1 * | 4/2002 | Haga .............................. | 370/352 |
| 6,545,982 B1 | 4/2003 | Murthy et al. | |
| 6,775,367 B1 | 8/2004 | Lehtinen | |
| 6,947,428 B1 * | 9/2005 | Andersson et al. ........ | 370/395.5 |
| 7,016,373 B2 * | 3/2006 | Wakayama et al. .......... | 370/463 |
| 7,173,932 B2 * | 2/2007 | Miki et al. .................... | 370/389 |
| 7,388,877 B2 * | 6/2008 | Ota et al. ...................... | 370/432 |
| 7,417,990 B2 * | 8/2008 | Ikeda et al. ................... | 370/390 |
| 7,430,205 B2 * | 9/2008 | Ota et al. ...................... | 370/393 |
| 7,477,648 B2 * | 1/2009 | Ota et al. ...................... | 370/401 |
| 7,526,562 B1 * | 4/2009 | Samprathi et al. ........... | 709/230 |
| 7,616,615 B2 * | 11/2009 | Sueyoshi et al. ............. | 370/338 |
| 7,626,934 B2 * | 12/2009 | Oouchi et al. ................ | 370/235 |
| 2001/0055285 A1 * | 12/2001 | Tomoike ....................... | 370/328 |
| 2002/0021659 A1 | 2/2002 | Meijen et al. | |

(Continued)

FOREIGN PATENT DOCUMENTS

JP   2000-209282   7/2000

(Continued)

OTHER PUBLICATIONS

Towards autonomous network domains; Schmid, S.; Eggert, L.; Brunner, M.; Quittek, J.; Network Lab., NEC Europe Ltd., Heidelberg, Germany; This paper appears in: INFOCOM 2005. 24th Annual Joint Conference of the IEEE Computer and Communications Societies. Proceedings IEEE.*

(Continued)

Primary Examiner — Salman Ahmed
(74) Attorney, Agent, or Firm — Mattingly & Malur, P.C.

(57) ABSTRACT

A packet forwarding apparatus comprises a plurality of line interfaces each for communicating with one of user terminals or one of redundant gateways, and a protocol processing unit for controlling packet forwarding among the line interfaces. The protocol processing unit forwards a connection initiation request packet received from a user terminal to the plurality of redundant gateways and forwards to the user terminal only one response packet which is selected according to connection load status information of each gateway stored in a load distribution management table from among a plurality of response packets received from the gateways within a predetermined period of time.

9 Claims, 16 Drawing Sheets

U.S. PATENT DOCUMENTS

| | | | |
|---|---|---|---|
| 2004/0133631 A1* | 7/2004 | Hagen et al. | 709/203 |
| 2005/0073964 A1 | 4/2005 | Schmidt et al. | |
| 2005/0226258 A1* | 10/2005 | Chischportich et al. | 370/401 |
| 2005/0286510 A1* | 12/2005 | Nakajima et al. | 370/386 |
| 2006/0056422 A1 | 3/2006 | Berkvens | |
| 2006/0085849 A1 | 4/2006 | Culbert | |
| 2006/0274744 A1* | 12/2006 | Nagai et al. | 370/389 |
| 2007/0044142 A1 | 2/2007 | Yoon et al. | |
| 2007/0101414 A1 | 5/2007 | Wing et al. | |
| 2007/0263538 A1 | 11/2007 | Hueck et al. | |
| 2008/0098467 A1* | 4/2008 | Miller et al. | 726/5 |

FOREIGN PATENT DOCUMENTS

| | | |
|---|---|---|
| JP | 2004-158977 | 6/2004 |
| JP | 2004-201201 | 7/2004 |
| JP | 2005-027192 | 1/2005 |
| JP | 2005-064936 | 3/2005 |
| JP | 2007-335945 | 12/2007 |
| WO | 2005-069562 | 7/2005 |

OTHER PUBLICATIONS

Topology management in dense MANET; This paper appears in: Personal, Indoor and Mobile Radio Communications, 2004. PIMRC 2004. 15th IEEE International Symposium.*

RFC:2516 "A Method for Transmitting PPP Over Ethernet (PPPoE)" by L. Mamakos, et al.

IEEE Std 802.1X-2001, Port-Based Network Access Control.

RFC2284, L. Bunk, et al, "PPP Extensible Authentication Protocol (EAP)", Mar. 1998, pp. 1-12.

* cited by examiner

FIG. 5A

CONNECTION MANAGEMENT TABLE 152

| TERMINAL PORT | TERMINAL MAC | GW PORT | GW MAC | STATUS | TIMER VALUE (s) | PRIORITY |
|---|---|---|---|---|---|---|
| 1 | 00-00-00-00-00-01 | 4 | 00-00-00-22-22-01 | 990 | — | — |
| : | : | : | : | : | : | : |
| 8 | 00-00-00-00-00-03 | 5 | 00-00-00-22-22-02 | 999 | — | — |
| m | 00-00-00-00-00-02 | — | — | PADO WAITING | 30,000 | |

ENm

FIG. 5B

| TERMINAL PORT | TERMINAL MAC | GW PORT | GW MAC | STATUS | TIMER VALUE (s) | PRIORITY |
|---|---|---|---|---|---|---|
| 1 | 00-00-00-00-00-01 | 4 | 00-00-00-22-22-01 | 990 | — | — |
| : | : | : | : | : | : | : |
| 8 | 00-00-00-00-00-03 | 5 | 00-00-00-22-22-02 | 999 | — | — |
| m | 00-00-00-00-00-02 | 5 | 00-00-00-22-22-03 | PADO WAITING | 29,980 | 12 |

ENm

FIG. 5C

| TERMINAL PORT | TERMINAL MAC | GW PORT | GW MAC | STATUS | TIMER VALUE (s) | PRIORITY |
|---|---|---|---|---|---|---|
| 1 | 00-00-00-00-00-01 | 4 | 00-00-00-22-22-01 | 990 | — | — |
| : | : | : | : | : | : | : |
| 8 | 00-00-00-00-00-03 | 5 | 00-00-00-22-22-02 | 999 | — | — |
| m | 00-00-00-00-00-02 | 4 | 00-00-00-22-22-01 | PADO WAITING | 29,975 | 11 |

ENm

FIG. 5D

| TERMINAL PORT | TERMINAL MAC | GW PORT | GW MAC | STATUS | TIMER VALUE (s) | PRIORITY |
|---|---|---|---|---|---|---|
| 1 | 00-00-00-00-00-01 | 4 | 00-00-00-22-22-01 | 990 | – | – |
| ⋮ | ⋮ | ⋮ | ⋮ | ⋮ | ⋮ | ⋮ |
| 8 | 00-00-00-00-00-03 | 5 | 00-00-00-22-22-02 | 999 | – | – |
| m | 00-00-00-00-00-02 | 4 | 00-00-00-22-22-01 | PADS WAITING | 29,970 | |
| ENm | | | | | | |

FIG. 5E

| TERMINAL PORT | TERMINAL MAC | GW PORT | GW MAC | STATUS | TIMER VALUE (s) | PRIORITY |
|---|---|---|---|---|---|---|
| 1 | 00-00-00-00-00-01 | 4 | 00-00-00-22-22-01 | 990 | – | – |
| ⋮ | ⋮ | ⋮ | ⋮ | ⋮ | ⋮ | ⋮ |
| 8 | 00-00-00-00-00-03 | 5 | 00-00-00-22-22-02 | 999 | – | – |
| m | 00-00-00-00-00-02 | 4 | 00-00-00-22-22-01 | 1000 | 29,970 | |
| ENm | | | | | | |

FIG. 5F

| TERMINAL PORT | TERMINAL MAC | GW PORT | GW MAC | STATUS | TIMER VALUE (s) | PRIORITY |
|---|---|---|---|---|---|---|
| 1 | 00-00-00-00-00-01 | 4 | 00-00-00-22-22-01 | 990 | – | – |
| ⋮ | ⋮ | ⋮ | ⋮ | ⋮ | ⋮ | ⋮ |
| 8 | 00-00-00-00-00-03 | 5 | 00-00-00-22-22-02 | 999 | – | – |
| | | | | | | |

FIG. 6

PORT MANAGEMENT TABLE 153

| PORT No. | GW CONNECTION FLAG | MAC ADDRESS |
|---|---|---|
| 1 | 0 | 00-00-00-00-00-01 ⋮ |
| ⋮ | ⋮ | ⋮ |
| 4 | 1 | 00-00-00-22-22-01 ⋮ |
| 5 | 1 | 00-00-00-22-22-03 ⋮ |
| ⋮ | ⋮ | ⋮ |
| 8 | 0 | 00-00-00-00-00-03 ⋮ |
| ⋮ | ⋮ | ⋮ |
| m | 0 | 00-00-00-00-00-02 ⋮ |
| ⋮ | ⋮ | ⋮ |
| n | 1 | 00-00-00-22-22-02 ⋮ |
| ⋮ | ⋮ | ⋮ |
| k | 1 | 00-00-00-22-22-04 ⋮ |
| ⋮ | ⋮ | ⋮ |

MULTI-CONNECTION MANAGEMENT TABLE 154

| TERMINAL MAC | MAXIMUM NUMBER OF CONNECTIONS | NUMBER OF CONNECTIONS |
|---|---|---|
| 00-00-00-00-00-01 | 2 | 0 |
| 00-00-00-00-00-03 | 2 | 0 |
| D.C | 1 | — |
|  |  |  |
|  |  |  |

1541 — 1542 — 1543

FIG. 8A
LOAD DISTRIBUTION MANAGEMENT TABLE 155

| GW MAC | OPERATIONAL PRIORITY | SELECTION PRIORITY | CONNECTION RATIO (%) | MAXIMUM NUMBER OF CONNECTIONS | NUMBER OF CONNECTIONS |
|---|---|---|---|---|---|
| 1551 | 1552 | 1553 | 1554 | 1555 | 1556 |
| 00-00-00-22-22-01 | 1 | 11 | 19.98 | 5,000 | 999 |
| 00-00-00-22-22-02 | 2 | 21 | 0.00 | 5,000 | 0 |
| 00-00-00-22-22-03 | 1 | 12 | 19.98 | 5,000 | 999 |
| 00-00-00-22-22-04 | 1 | 13 | 19.98 | 5,000 | 999 |
| 00-00-00-22-22-99 | 3 | 31 | 0.00 | 5,000 | 0 |
|  |  |  |  |  |  |

FIG. 8B

| GW MAC | OPERATIONAL PRIORITY | SELECTION PRIORITY | CONNECTION RATIO (%) | MAXIMUM NUMBER OF CONNECTIONS | NUMBER OF CONNECTIONS |
|---|---|---|---|---|---|
| 00-00-00-22-22-01 | 1 | 13 | 20.00 | 5,000 | 1,000 |
| 00-00-00-22-22-02 | 2 | 21 | 0.00 | 5,000 | 0 |
| 00-00-00-22-22-03 | 1 | 11 | 19.98 | 5,000 | 999 |
| 00-00-00-22-22-04 | 1 | 12 | 19.98 | 5,000 | 999 |
| 00-00-00-22-22-99 | 3 | 31 | 0.00 | 5,000 | 0 |
|  |  |  |  |  |  |

FIG. 8C

| GW MAC | OPERATIONAL PRIORITY | SELECTION PRIORITY | CONNECTION RATIO (%) | MAXIMUM NUMBER OF CONNECTIONS | NUMBER OF CONNECTIONS |
|---|---|---|---|---|---|
| 00-00-00-22-22-01 | 1 | 10 | 100.00 | 5,000 | 5,000 |
| 00-00-00-22-22-02 | 2 | 21 | 0.02 | 5,000 | 1 |
| 00-00-00-22-22-03 | 1 | 10 | 100.00 | 5,000 | 5,000 |
| 00-00-00-22-22-04 | 1 | 10 | 100.00 | 5,000 | 5,000 |
| 00-00-00-22-22-99 | 3 | 31 | 0.00 | 5,000 | 0 |
|  |  |  |  |  |  |

FIG. 8D

| GW MAC | OPERATIONAL PRIORITY | SELECTION PRIORITY | CONNECTION RATIO (%) | MAXIMUM NUMBER OF CONNECTIONS | NUMBER OF CONNECTIONS |
|---|---|---|---|---|---|
| 00-00-00-22-22-01 | 1 | 11 | 99.98 | 5,000 | 4,999 |
| 00-00-00-22-22-02 | 2 | 21 | 0.02 | 5,000 | 1 |
| 00-00-00-22-22-03 | 1 | 10 | 100.00 | 5,000 | 5,000 |
| 00-00-00-22-22-04 | 1 | 10 | 100.00 | 5,000 | 5,000 |
| 00-00-00-22-22-99 | 3 | 31 | 0.00 | 5,000 | 0 |
|  |  |  |  |  |  |

PACKET FORWARDING APPARATUS HAVING GATEWAY LOAD DISTRIBUTION FUNCTION

CLAIM OF PRIORITY

The present application claims priority from Japanese patent application serial No. 2006-295020, filed on Oct. 31, 2006, the content of which is hereby incorporated by reference into this application.

BACKGROUND OF THE INVENTION (1) Field of the Invention

The present invention relates to a packet forwarding apparatus forming an Internet access network. More particularly, the invention relates to a packet forwarding apparatus having a gateway load distribution function of selecting one gateway from among plural gateways connected to an Internet transit network and connecting a user terminal to the Internet transit network via the selected gateway.

(2) Description of Related Art

At the moment, an authentication-based high-speed Internet connection service is provided. In this connection service, a user terminal is connected to an authentication server via a high-speed access line such as an Asymmetric Digital Subscriber Line (ADSL), Fiber to The Home (FTTH), or wireless LAN, and the user terminal is connected to the Internet when successful in authentication.

In the authentication-based high-speed Internet connection service, each user terminal is connected to a transit network managed by an Internet Services Provider (ISP) via, for example, a gateway node such as a Broadband Access Server (BAS) that terminates a high-speed access network. If the user terminal is a PPPoE terminal for Point to Point Protocol over Ethernet (PPPoE) prescribed in RFC 2516, the BAS terminates PPPoE or PPP, a protocol for connecting with the user terminal, and forwards layer-3 packets to the transit network.

As IP telephone services have launched recently, the above-mentioned high-speed access network is required to provide a high quality of communication comparable to that of an existing telephone network. For this reason, an enhanced access network having a plurality of redundant BASs deployed at the entrance to the transit network is configured so as to keep redundant routes for connecting user terminals to the transit network and to minimize downtime of a BAS service having a large impact on the network operation when a failure occurs. In an access network including such redundant BASs, it is expected to provide a network configuration that can distribute the connection load among the BASs properly.

In addition to the above layer-3 Internet connection service, an authentication-based connection service at a layer-2 level is also provided in recent years. In the layer-2 level authentication-based connection service, user authentication is carried out in accordance with a PPP Extensible Authentication Protocol (EAP) in IEEE 802.1X prescribed in RFC 2284. In this case, the transit network is comprised of Ethernet. In the EAP, user authentication is performed by communicating EAP over LAN (EAPOL) packets between a supplicant which is a user terminal to be an authentication requester and an authenticator which is a gateway node to be an authentication executor. The authenticator forwards each packet transmitted from an authenticated user terminal to the transit network by layer-2 packet forwarding.

In the layer-2 level Internet connection service using the IEEE 802.1X, each user terminal (supplicant) sends an IP address request to a Dynamic Host Configuration Protocol (DHCP) server which is managed by an ISP and receives an IP address assigned, for example, in an EAP forwarding phase which is executed after the completion of an EAP authentication phase. Because IEEE 802.1X fundamentally assumes to connect each supplicant with an authenticator in a one-to-one connection manner, the authenticator has to be provided with a plurality of connection ports at least equal to the number of supplicants it serves. However, in a case where a plurality of supplicants (user terminals) are connected to the authenticator via a layer-2 switch (L2SW), the authenticator can communicate with the plurality of supplicants through one connection port if each user terminal uses a special multicast MAC address ("01-80-C2-00-00-03") to a EAPOL packet and the L2SW can pass the multicast EAPOL packet to the authenticator.

For the layer-2 level Internet connection service, redundant gateways (authenticators) and load distribution among them are also demanded with the spread of IP telephone service, as in the case of the layer-3 connection service described above.

As a related art, for example, Japanese Patent Application Laid-Open Publication No. 2005-64936 (Patent Document 1) proposes a system and method for PPPoE session distribution. In this system, a PPPoE session management apparatus is placed between a plurality of Broadband Remote Access Servers (BRASs) each connected to a plurality of ISPs, and PPPoE terminals. Upon receiving a PADI packet from one of the PPPoE terminals, the PPPoE session management apparatus selects a most suitable BRAS to be connected with the PPPoE terminal and forwards the PADI packet to the selected BRAS.

In order to provide an IP telephone service to each user terminal via the above transit network, it is required to enhance the communication performance of the access network and the transit network up to a level comparable to that of an existing telephone network. In the layer-3 connection service according to PPPoE, an access network having a redundant BASs configuration can be built as described above.

In the network of the redundant BASs configuration, a plurality of BASs reply with response packets called a PPPoE Active Discovery Offer (PADO) in response to a PPPoE Active Discovery Initiation (PADI) packet broadcasted from a PPPoE terminal, the PPPoE terminal selects one of the BASs that reply with the PADO packets and executes a succeeding communication control procedure starting from transmission of a PPPoE Active Discovery Request (PADR) packet with the selected BAS.

However, the selection of a BAS by the PPPoE terminal depends on the reception timing of each PADO packet or a BAS selection algorithm implemented on the PPPoE terminal. Thus, in a communication network in which each PPPoE terminal selects one of BASs, it is unable to control load distribution among the redundant BASs from ISP or telecommunications carrier side that operates the transit network. Therefore, it is impossible for the ISP to manage the BASs, for example, in a load distribution manner in which a BAS to be connected with a PPPoE is selected so as to equalize the connection loads of the redundant BASs, or to operate the redundant BASs by dividing them into an active group and a standby group.

According to the PPPoE session distribution system proposed in Patent Document 1, the load is distributed among a plurality of BRASs by the PPPoE session management apparatus.

The PPPoE session management apparatus described in Patent Document 1 is provided with a BRAS IP address management table for storing the number of remaining IP addresses for each ISP held by each BRAS, and an ISP PPP session mapping table for indication the correspondence of a terminal MAC address to an ISP to which the terminal is connected.

Upon receiving a PADI packet broadcasted from a user terminal, the PPPoE session management apparatus determines a destination ISP by referring to the ISP PPP session mapping table, selects a BRAS having the largest number of remaining IP addresses for the destination ISP by referring to the BRAS IP address management table, and transmits the PADI packet after converting it into a unicast packet to the selected BRAS.

In Patent Document 1, however, each BRAS having terminated a PPPoE session has to report the number of PPPoE sessions and the number of remaining IP addresses currently held by it to the PPPoE session management apparatus, in order to make proper the contents of the BRAS IP address management table to be referred by the PPPoE session management apparatus. The PPPoE session management apparatus updates the BRAS IP address management table according to the data reported from each BRAS. According to the load distribution method described in Patent Document 1, therefore, each BRAS must be provided with a new function of reporting the number of PPPoE sessions and the number of remaining IP addresses to the PPPoE session management apparatus.

As to the layer-3 connection service according to PPPoE or layer-2 connection service according to IEEE 802.1X, the present inventors have proposed, as Japanese Patent Application No. 2006-162074, a network topology in which a packet relay apparatus connected to a plurality of user terminals multicasts a PADI packet (or EAPOL-Start packet) received from each user terminal to a transit network, a plurality of gateways (BASs or authenticators) reply PADO (or EAP-Request/ID Request) packets in response to the PADI packet, and the packet relay apparatus forwards only one response packet received from a particular gateway selectively to the requester user terminal. According to the above network topology, redundant gateways become feasible without changing the functionality of each gateway. However, the above patent application does not describe about the control of load distribution among the redundant gateways by the packet relay apparatus.

SUMMARY OF THE INVENTION

An object of the present invention is to provide a packet forwarding apparatus suitable for a network configuration in which an access network connected with a plurality of user terminals and an Internet transit network are connected by a plurality of redundant gateways (GWs), such as BASs and authenticators.

The packet forwarding apparatus according to the present invention can connect each user terminal to one of redundant gateways while implementing load distribution among these gateways, without requiring addition of a special function to each gateway. The packet forwarding apparatus is located between a plurality of user terminals and a plurality of redundant gateways (GWs) connected to a transit network for the Internet.

To achieve the above object, the packet forwarding apparatus of the present invention comprises a plurality of line interfaces each for communicating with one of the user terminals or one of the redundant gateways through connection lines and a protocol processing unit for controlling forwarding of user packets and communication control packets among the plurality of line interfaces.

The protocol processing unit has a load distribution management table for storing connection load status information of each of the redundant gateways in association with an identifier of the gateway. The protocol processing unit is configured to receive a connection initiation request packet transmitted from one of the user terminals to connect the user terminal to the transit network, forward the connection initiation request packet to the plurality of redundant gateways, receive a plurality of response packets replied from the redundant gateways in response to the connection initiation request packet within a predetermined period of time, forward only one response packet transmitted from particular one of the redundant gateways to the user terminal which is the source of the connection initiation request packet, and forward communication control packets and user packets subsequently received from the user terminal to the particular gateway, wherein the response packet to be forwarded to the user terminal is selected from among the plurality of response packets according to the connection load status information stored in the load distribution management table.

Here, if the user terminal is, for example, a PPPoE terminal, the connection initiation request packet is a PADI packet and the response packets from the gateways (BASs) are PADO packets. The source terminal of the PADI packet performs a subsequent communication control procedure according to PPPoE with the source gateway of the PADO packet forwarded by the packet forwarding apparatus.

If the user terminal is, for example, a supplicant in IEEE 802.1X, the connection initiation request packet is an EAPOL-Start packet and the response packets from the gateways (authenticators) are EAP-Request/ID Request packets. The source supplicant of the EAPOL-Start packet performs a subsequent communication control procedure according to IEEE 802.1X with the source gateway of the EAP-Request/ID Request packet forwarded by the packet forwarding apparatus.

The load distribution management table to be referred by the protocol processing unit includes, as the connection load status information, the maximum number of connections acceptable by each of the redundant gateways and the number of existing connections being connected with the gateway at present. In this case, the protocol processing unit specifies the response packet to be forwarded to the user terminal by selecting the particular gateway based on a connection ratio determined for each gateway by the maximum number of connections and the number of existing connections.

In an embodiment of the present invention, the load distribution management table includes, as the connection load status information, the maximum number of connections acceptable by each of said redundant gateways, the number of existing connections being connected with the gateway at present, the connection ratio determined by the maximum number of connections and the number of existing connections, and a connection priority. In this case, the protocol processing unit updates, each time the particular gateway was selected, the number of connections and the connection ratio of the particular gateway in the load distribution management table, calculates a new selection priority level for each of the gateways based on the updated connection ratio of the particular gateway and the connection ratios of the other gateways, stores the new selection priority level as the selection priority for each of the gateways in the load distribution management table, thereby to select a new particular gateway in response to a new connection initiation request packet based on the selection priority levels of the gateways stored in the load distribution management table.

In an embodiment of the present invention, the connection load status information stored in the load distribution management table includes an operation priority indicating the operation mode of each of the gateways, and the protocol processing unit selects the particular gateway from among a plurality of gateways each having the first level of operation priority. The protocol processing unit selects, when the number of connections has reached the maximum number of connections for all the gateways having the first level of operation priority in the load distribution management table, the particular gateway from among a plurality of gateways each having the second level of operation priority. By defining the operation priority levels in the connection load status information, it becomes possible to operate the redundant gateways, dividing into an active group and a standby group.

More specifically, in an embodiment of the present invention, the protocol processing unit is provided with a multi-connection management table for indicating, in association with an identifier of each of said user terminals, the maximum number of connections allowed in advance to each of the user terminals and the number of existing connections the user terminal has at present. By referring to multi-connection management when the connection initiation request packet was received, it becomes possible for the protocol processing unit to discard the connection initiation request packet if the number of existing connections of a user terminal which is the source of the connection initiation request packet has reached the maximum number of connections in the multi-connection management, and to forward the connection initiation request packet to the redundant gateways only when the number of existing connections of the user terminal is less than the maximum number of connections in the multi-connection management.

In an embodiment of the present invention, the protocol processing unit is provided with a connection management table comprising a plurality of table entries each for storing, in association with an identifier of the user terminal which is the source of a connection initiation request packet, a selection priority of a gateway selected as a candidate gateway having a possibility of connecting with the user terminal. In this case, the protocol processing unit registers, into the connection management table when the connection initiation request packet was received, a new table entry including the user terminal identifier extracted from a header of the received packet, compares, each time a response packet replied from one of the redundant gateways in response to the connection initiation request packet was received, the selection priority of the source gateway, which is the source of the response packet, indicated in the load distribution management table and the selection priority indicated in a table entry corresponding to a destination user terminal of the response packet in the connection management table, registers the selection priority of the source gateway into the table entry if the selection priority is not registered in the table entry or if the level of the selection priority of the source gateway is higher than the selection priority registered in the table entry, and holds the response packet in a transmission waiting state. The response packet is forwarded from the protocol processing unit to the requester user terminal having transmitted the connection initiation request packet when timeout of a predetermined timer value is detected The packet forwarding apparatus of the present invention can function as an L2SW, a PON system, a wireless access point, or a wireless bridge by applying metal line interfaces, optical line interfaces, wireless line interfaces, or line interfaces having an Optical Line Terminal (OLT) function used in a central office for PON (Passive Optical Network) as the line interfaces, respectively.

As the packet forwarding apparatus of the present invention is configured to forward a connection initiation request packet received from a user terminal to redundant gateways and to forward to the user terminal a response packet, which was received from a particular gateway and selected from among a plurality of response packets replied from the redundant gateways based on the connection load status information of each gateway, load distribution among the redundant gateways can be accomplished without special software implementation on each of user terminals and without adding a special function to each gateway. Further, as the algorithm for selecting a particular gateway to be connected with a user terminal can be changed depending on demands of an ISP or telecommunications carrier, it is able to adopt a load distribution desirable for the ISP or telecommunications carrier.

BRIEF DESCRIPTION OF THE DRAWINGS

These and other features, objects and advantages of the present invention will become more apparent from the following description when taken in conjunction with the accompanying drawings wherein:

FIGS. 5A to 5F illustrate an example of a structure and changes in the contents of a connection management table 152 provided in the GW selector 10;

FIG. 6 shows an example of a structure of a port management table 153 provided in the GW selector 10;

FIG. 7 shows an example of a structure of a multi-connection management table 154 provided in the GW selector 10;

FIGS. 8A to 8D illustrate an example of a structure and changes in the contents of a load distribution management table 155 provided in the GW selector 10;

DETAILED DESCRIPTION OF THE PREFERRED EMBODIMENTS

Preferred embodiments of a packet forwarding apparatus according to the present invention will be described hereinafter with reference to the drawings.

Figure 1:
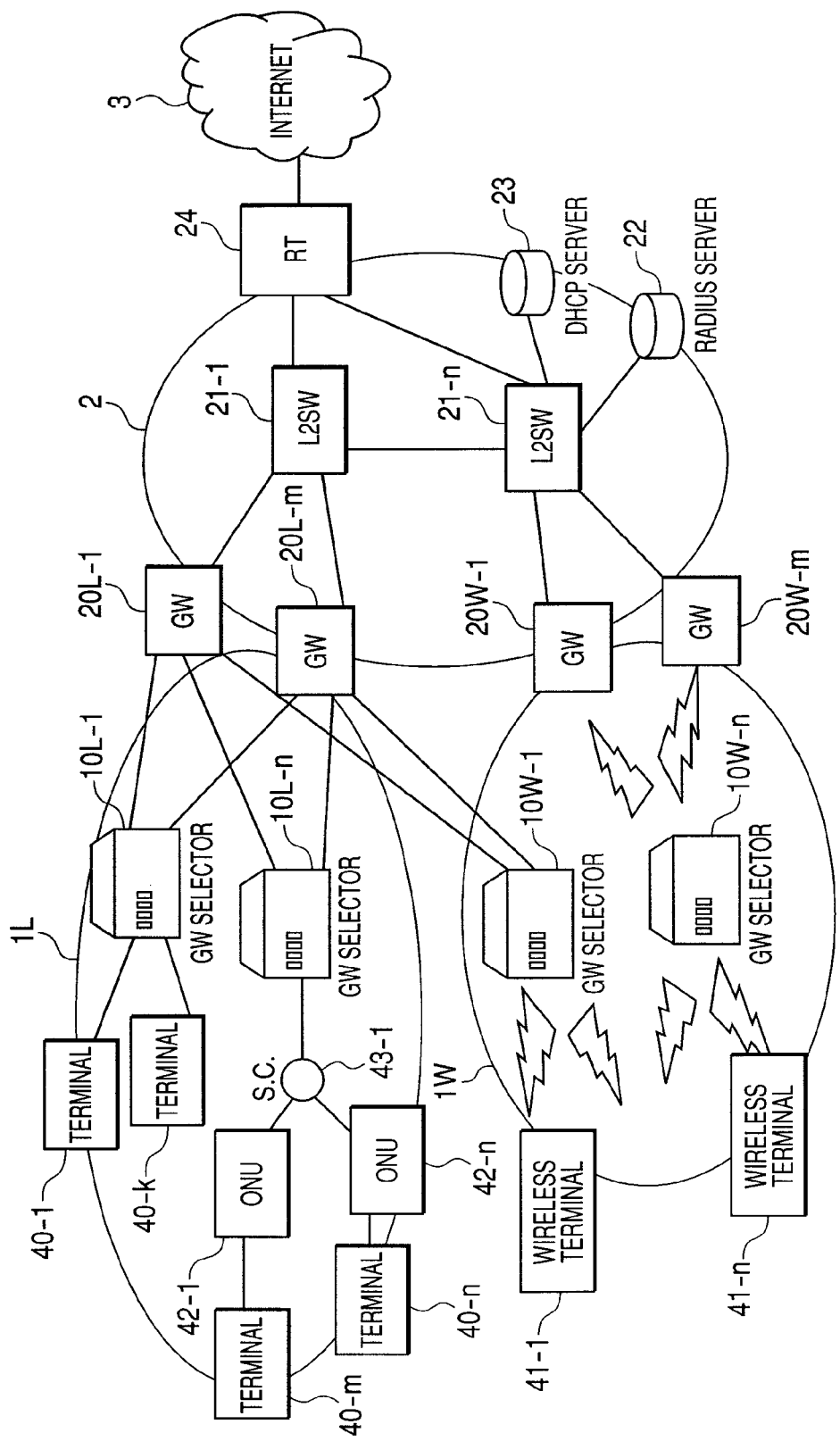
FIG. 1 shows an example of a communication network topology to which packet forwarding apparatuses (GW selectors) of the present invention are applied.

FIG. 1 shows a communication network topology to which packet forwarding apparatuses of the present invention are applied. The communication network system presented here includes a wired access network 1L, a wireless access network 1W, a transit network 2 belonging to a telecommunications carrier or an ISP, and an Internet network 3.

The wired access network 1L and the wireless access network 1W are connected to the transit network 2 via gateways (GWs) 20L (20L-1, 20L-m) and 20W (20W-1, 20W-m), respectively. Each gateway has a function of terminating communication frames conforming to different protocols such as, for example, IEEE 802.1X and PPPoE.

The wired access network 1L includes a plurality of packet forwarding apparatuses 10L (10L-1, 10L-n) and a plurality of LAN terminals 40 (40-1 to 40-n) each connected to one of packet forwarding apparatuses 10L. Each of the LAN terminals 40 has a session connection function conforming to IEEE 802.1X, PPPoE, or the like, Each of the packet forwarding apparatuses 10L is connected to a plurality of redundant GWs 20L (20L-1, 20L-m).

Each packet forwarding apparatus 10L according to the present invention has a gateway selecting function of selectively connecting each wired LAN terminal 40 to one of the redundant GWs 20L, as will be described later, in addition to a normal L2SW function of forwarding received packets according to layer 2 header information. In the following description, noting at the gateway selecting function especially, the packet forwarding apparatuses 10L will be referred to as "GW selectors".

A first embodiment of the invention is characterized in that the GW selector has a load distribution control function for connecting the wired LAN terminal 40 to one of redundant GWs 20L (20L-1, 20L-m), while distributing the load of the redundant GWs.

In the wired access network 1L presented in FIG. 1, a GW selector 10L-1 communicates with a plurality of wired LAN terminals (40-1 to 40-k) via individual access lines, and a GW selector 10L-n communicates with a plurality of wired LAN terminals (40-m to 40-n) via a Passive Optical Network (PON). The PON comprises a plurality of subscriber connection apparatus ONUs (Optical Network Units) 50 (50-1 to 50-n), an office side apparatus OLT (Optical Line Terminal) incorporated in the GW selector 10L-n, and an optical fiber network with a structure in which one optical fiber connected to the OLT is branched into a plurality of branch optical fibers by a star coupler (S.C.) 51-1.

On the other hand, the wireless access network 1W comprises a plurality of wireless terminals 41 (41-1 to 41-n) each having a session connection function in accordance with IEEE 802.1X, PPPoE, or the like, and a plurality of packet forwarding apparatuses 10W (10W-1, 10W-n) for communicating with these wireless terminals 41. In the exemplified network presented here, a packet forwarding apparatus 10W-1 has a wireless-wired conversion function and is connected to a plurality of redundant GWs 20L (20L-1 to 20L-m). A packet forwarding apparatus 10W-n has a wireless hub function such as frequency conversion, frame conversion and others and is connected to a plurality of redundant GWs 20W (20W-1, 20W-m).

Each of packet forwarding apparatuses 10W (10W-1 to 10W-n) forming the wireless access network 1W also has a gateway selecting function to selectively connect each wireless terminal 41 to one of the redundant GWs 20. Thus, in the following description, these packet forwarding apparatuses 10W as well will be referred to as "GW selectors".

The transit network 2 comprises a plurality of layer-2 switches (L2SWs) 21 (21-1 to 21-n), a user authentication server (RADIUS server) 22, a DHCP server 23 for allocating an IP address to each user terminal, and a router 24 for connecting the transit network to the Internet network 3. In the exemplified network presented here, an L2SW 21-1 is connected to the router 24 and a group of redundant GWs (20L-1 to 20L-m), and an L2SW 21-n is connected to the router 24 and another group of redundant GWs (20W-1 to 20W-m). Although the RADIUS server 22 and the DHCP server 23 are connected to the L2SW 21-n here, at least one of them may be connected to the L2SW 21-1. One of the L2SWs 21-1 and 21-n may be connected to the router 24 via the other L2SW.

Figure 2:
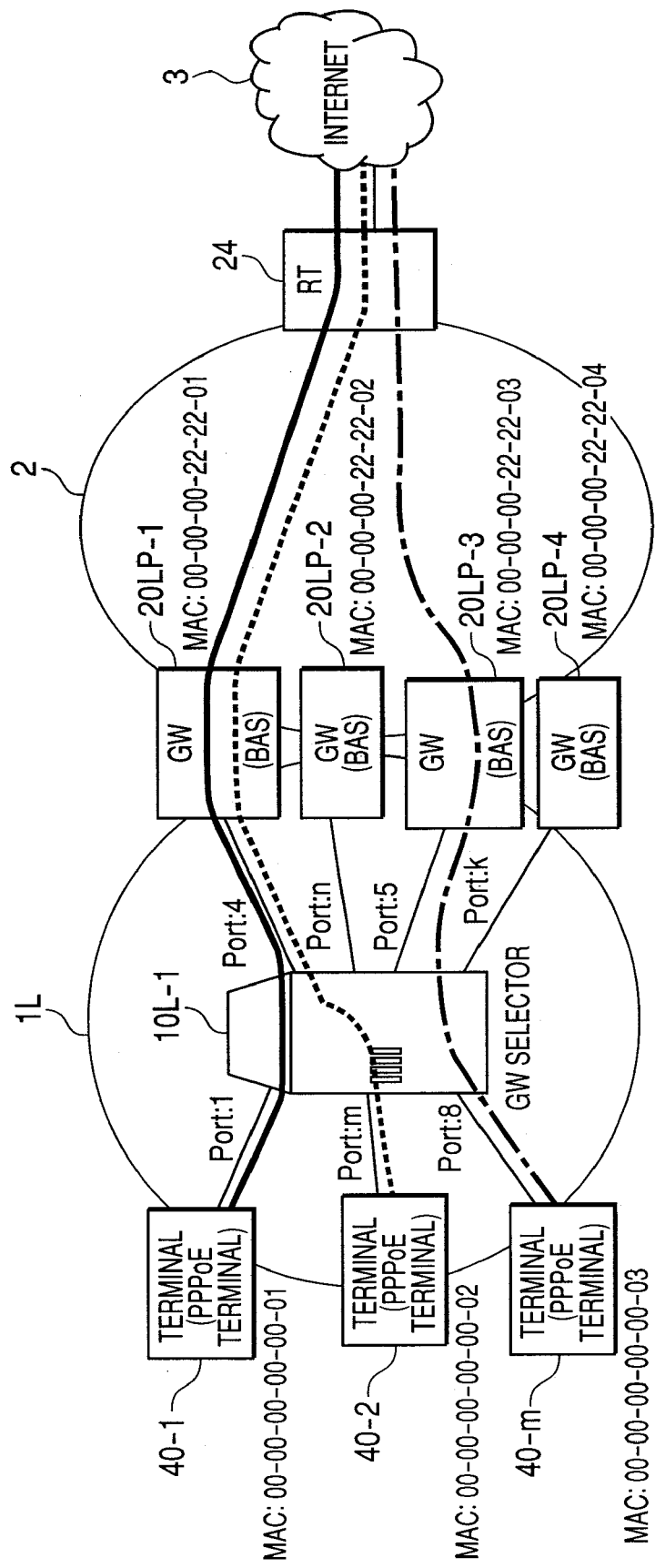
FIG. 2 is a diagram to explain a GW selecting function of a GW selector of the present invention.

FIG. 2 is a diagram to explain the gateway selecting function provided in the GW selector 10L-1 of the present invention. Other GW selectors 10L-n, 10W-1 to 10W-n also have the same gateway selecting function as the GW selector 10L-1. An operation will be described below in a case where the GW selector 10L-1 is connected to four redundant GWs (20LP-1 to 20LP-4) and receives a session connection request from one of the wired LAN terminals 40-1 to 40-m which execute a session connection procedure according to PPPoE. In the figure, "MAC xx-xx-xx-xx-xx-xx" attached to each terminal block and GW block denotes a MAC address value of a wired LAN terminal or GW.

Upon receiving a PPPoE connection request from the wired LAN terminal 40-1, the GW selector 10L-1 performs a connection control procedure, regarding the wired LAN terminal 40-1 as a PPPoE terminal and the GWs connected to the GW selector 10L-1 as BASs 20LP-1 to 20LP-4 (20L-1 to 20L-m in FIG. 1).

Upon receiving responses to the connection request from these GWs (BASs), the GW selector 10L-1 selects any one of GWs, for example, a GW 20L-1 as an active BAS for the wired LAN terminal 40-1 and continues a subsequent connection control procedure. Once the active BAS for communicating with the PPPoE terminal 40-1 has been determined, other GWs 20L-2 (20LP-2) to 20L-m (20LP-m) are not involved in forwarding of packets for the PPPoE terminal 40-1.

In a similar manner, the GW selector 10L-1 selects the GW 20L-1 (20LP-1) in response to a connection request from a PPPoE terminal 40-2 and selects the GW 20L-3 (20LP-3) in response to a connection request from the PPPoE terminal 40-m. Each PPPoE terminal 40 communicates with the Internet 3 via the GW 20 selected by the GW selector 10L-1. An algorithm of GW selection (load distribution) executed by the GW selector 10L-1 will be detailed later.

FIGS. 3A to 3D illustrate the formats of communication control frames to be used in PPPoE.

Figure 3A:
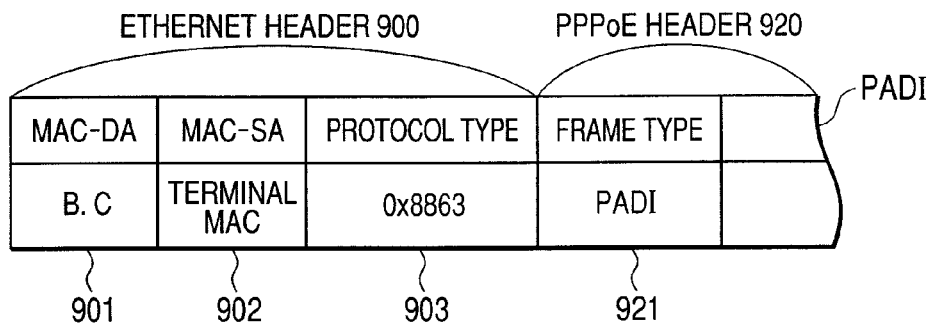
FIGS. 3A to 3D show the formats of communication control frames being used in PPPoE.

FIG. 3A shows the format of a connection initiation packet including PADI (PPPoE Active Discovery Initiation), which is transmitted from a wired LAN terminal 40 to a GW 20.

Figure 3B:
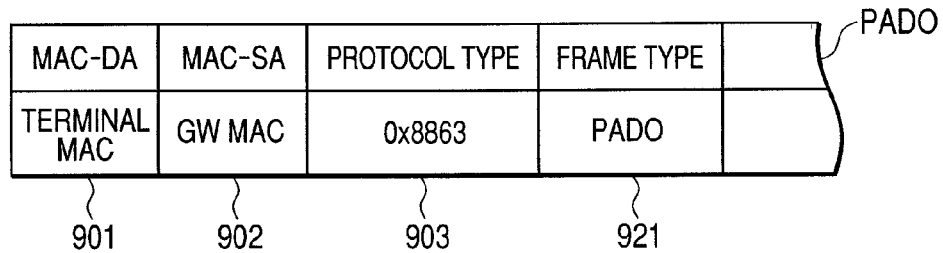
Figure 3C:
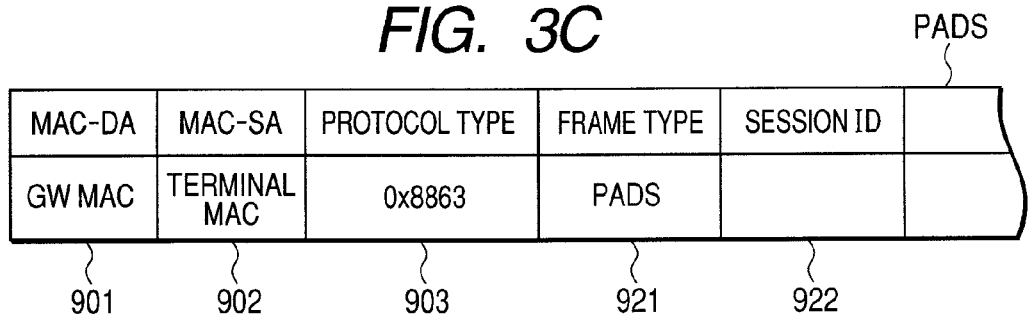
Figure 3D:
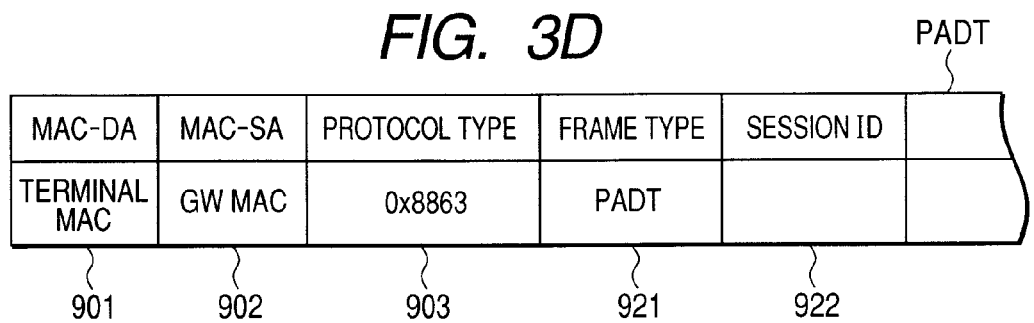

FIG. 3B shows the format of a connection initiation response packet including PADO (PPPoE Active Discovery Offer), which is transmitted from the GW 20 to the wired LAN terminal 40. FIG. 3C shows the format of a session ID notification packet including PADS (PPPoE Active Discovery Session-Confirmation), which is transmitted from the GW 20 to the wired LAN terminal 40. FIG. 3D shows the format of a disconnection notification packet including PADT (PPPoE Active Discovery Terminate), which is issued by the wired LAN terminal 40 or the GW 20. These communication control frames are provided with an Ethernet header 900 and a PPPoE header 920.

As shown in FIG. 3A, PADI includes a broadcast MAC address (B. C) in a MAC-DA 901 field and the MAC address of the wired LAN terminal 40 being the source of the PADI in a MAC-SA 902 field. In a protocol type 903 field, a particular value representing PPPoE such as "0x8863" is set. In a frame type 921 field of the PPPoE header, a code denoting that this PPPoE frame includes "PADI" is set.

As shown in FIG. 3B, PADO includes the MAC address of the wired LAN terminal 40 being the source of the PADI in the MAC-DA 901 field and the MAC address of the GW 20 in the MAC-SA 902 field. In the protocol type 903 field, a particular value representing PPPoE such as "0x8863" is set. In the frame type 921 field of the PPPoE header, a code denoting that this frame includes "PADO" is set.

As shown in FIG. 3C, PADS includes the MAC address of the wired LAN terminal 40 in the MAC-DA 901 field and the MAC address of the GW 20 in the MAC-SA 902 field. In the protocol type 903 field, a particular value representing PPPoE such as "0x8863" is set. In the frame type 921 field of the PPPoE header, a code denoting that this frame includes "PADS" is set. In a session ID 922 field, the value of a session ID assigned to the wired LAN terminal 40 from the GW 20 is set.

As shown in FIG. 3D, PADT includes, if it is transmitted from the wired LAN terminal 40 to the GW 20, the MAC address of the GW 20 in the MAC-DA 901 field and the MAC address of the wired LAN terminal 40 in the MAC-SA 902 field. In the protocol type 903 field, a particular value representing PPPoE such as "0x8863" is set. If PADT is transmitted from the GW 20 to the wired LAN terminal 40, the addresses in the MAC-DA 901 and MAC-SA 902 fields are reversed. In the frame type 921 field of the PPPoE header, a code denoting that this frame includes "PADT" is set. In the session ID 922 field, the ID of the session to be disconnected is set.

Figure 4:
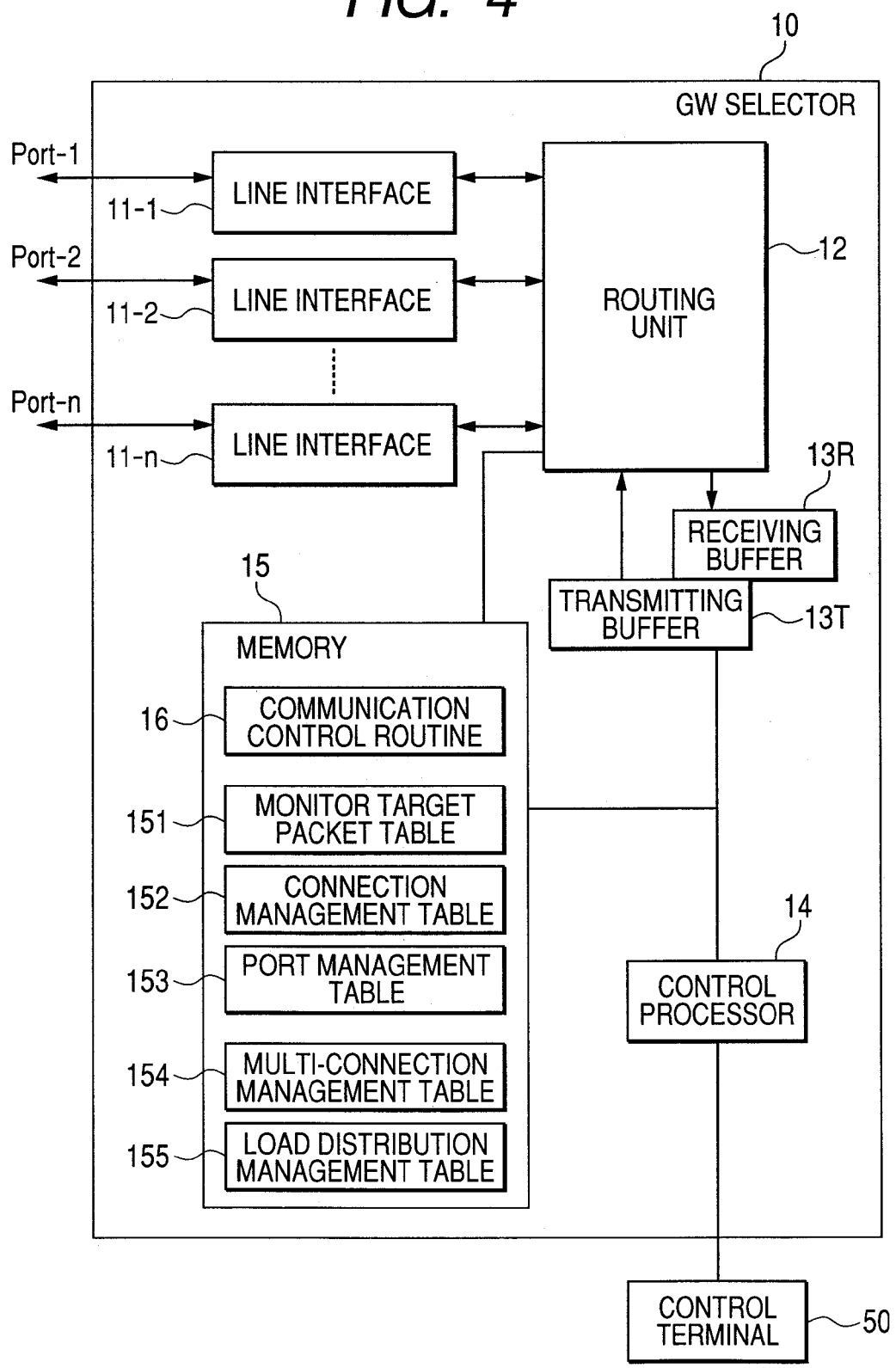
FIG. 4 is a block diagram illustrating an embodiment of the GW selector 10 of the present invention.

FIG. 4 illustrates an embodiment of a packet forwarding apparatus (GW selector) 10 according to the present invention.

The GW selector 10 comprises a plurality of line interfaces 11 (11-1 to 11-*n*) to which individual port numbers (Port-1 to Port-n) are assigned, a routing unit 12 connected to the line interfaces, a transmitting buffer 13T and a receiving buffer 13R for buffering communication control packets, a control processor 14, and a memory 15.

The routing unit 12 and the control processor 14 constitute a protocol processing unit for controlling packet forwarding among the line interfaces 11. In the memory 15, a communication control routine 16 to be executed by the processor, a monitor target packet table 151, a connection management table 152, a port management table 153, a multi-connection management table 154 and a load distribution management table 155 are stored.

The communication control routine 16 includes receive processing routines for various types of control packets, which will be described later with reference to FIGS. 10 to 15, a load distribution processing routine and a timer monitoring routine.

The monitor target packet table 151 specifies the types of communication control packets to be processed by the control processor 14. Operation mode of the control processor 14 can be changed by rewriting the contents of the monitor target packet table 151 from a control terminal 50 in accordance with input operations by an operator. As to the connection management table 152 and the port management table 153, detailed description will be made later with reference to FIGS. 5 and 6. As to the multi-connection management table 154 and a load distribution management table 155, detailed description will be made later with reference to FIGS. 7 and 8.

If the GW selector 10 is a GW selector 10L-1 in a wired access network 1L shown in FIG. 1, each of the line interfaces 11-1 to 11-*n* has a function of terminating frames conforming to a communication protocol applied to each connection line, such as Ethernet, ATM, and POS (PPP over SONET). If the GW selector 10 is a GW selector 10L-n connected to a PON, each of the line interfaces 11-1 to 11-*n* is configured to have an OLT function that terminates PON frames such as, for example, GE-PON, G-PON, and WDM-PON.

If the GW selector 10 is a GW selector 10W-1 in a wireless access network 1W shown in FIG. 1, each of the line interfaces for wireless terminals 41 has a wireless interface function conforming to a communication protocol applied to a wireless link, such as, for example, IEEE 802.11a, IEEE 802.11b, IEEE 802.11g, IEEE 802.16a, and PHS. Each of the line interfaces for the GWs 20 has an interface function conforming to a communication protocol applied to a wired LAN section, such as Ethernet, ATM, POS (PPP over SONET), GE-PON, G-PON, and WDM-PON.

If the GW selector 10 is a GW selector 10W-n shown in FIG. 1, each of the line interfaces has a wireless interface function conforming to a communication protocol applied to a wireless link, as is the case of the line interface for the wireless terminal 41 in the GW selector 10W-1.

FIGS. 5A to 5F illustrate a structure of the connection management table 152 and changes in the contents of the table.

The connection management table 528 comprises a plurality of table entries, each having a port number 1521 of a line interface connected to a terminal. Hereinafter, the port number is referred to as a terminal port number. Each table entry indicates the correspondence of the terminal port number 1521 to a terminal MAC address 1522, a port number 1523 of a line interface connected to a GW (hereinafter referred to as a GW port number), a GW MAC address 1524, a status 1525, a timer value 1526 and priority 1527.

The GW MAC 1524 denotes the MAC address of a GW to be connected with a terminal having the terminal MAC 1522. Hereinafter, the GW will be referred to as a candidate GW. The priority 1527 denotes a level of priority of selecting the candidate GW defined in the load distribution management table 155 which will be described with FIG. 8. The status 1525 indicates the current status in a communication control procedure being executed in a session with a user terminal having the terminal MAC address 1522. In an illustrative embodiment, the status indicates the type of a communication control packet that the GW selector is waiting to receive or a session ID.

FIG. 6 shows an example of the structure of the port management table 153.

The port management table 153 includes a plurality of table entries corresponding to the port numbers 1531 of the line interfaces 11-1 to 11-*n*. Each table entry indicates a GW connection flag 1532 for indicating whether a line interface having the port number 1531 is connected to connection lines for one of the GWs and a source MAC address 1533 for indicating the source of each packet received through the line interface.

The port management table 153 shown here represents the connective relation among the GW selector 10L-1, the PPPoE terminals 40-1 to 40-*m*, and the GWs 20LX-1 to 20LP-2 in the network topology schematically shown in FIG. 2, as appreciated from the values of the port number 1531 and the values in the MAC address 1533 column. In practical application, the GW connected to the GW selector 10L-1 may have both functions of authenticator and BAS or may only have either of these functions. In the latter case, the GW operating as an authenticator (or BAS) makes no response to a connection initiation packet of PPPoE (or EAPOL).

FIG. 7 shows the structure of the multi-connection management table 154.

The GW to be connected to a user terminal is determined depending on the connection load status of the GWs at the time when a connection initiation request is issued. Thus, in a case where a plurality of connection initiation requests are issued from a same user terminal at shifted times, the user terminal may be connected to different GWs for each connection initiation request or connected to a same GW successively.

Assume here that the GW selector 10 connected to GWs 20L-1 and 20L-2 performs load distribution (GW selection) in a state where the maximum number of connections permitted for each GW to communicate with the same terminal is set to "2. In this case, when a user terminal 40-1 having been connected to the GW 20L-1 with its first and second connection initiation requests issues a third connection initiation request, if the GW selector 10 selects the GW 20L-2, the user terminal 40-1 can get access to the Internet via the GW 20L-2. However, if the GW selector 10 selects the GW 20L-1 again, the third connection initiation request is rejected as an invalid connection request in excess of the maximum number of connections, because the number of connections of the user terminal 40-1 has already reached the maximum number "2".

The multi-connection management table 154 in the present embodiment is used to restrict the number of multi-connection requests from the same terminal and comprised of a plurality of table entries for managing the number of connections for each terminal. Each table entry indicates the correspondence of a terminal MAC address 1541 to the maximum number of connections 1542 permitted for the terminal and the number of connections 1543 being established at the present. By managing the number of multi-connections for each user terminal, independently of the GW to be the target of connections, the present invention can permit user terminals to have equitable multi-connections, no matter which GW is selected by load distribution.

The values of terminal MAC 1541 and maximum number of connections 1542 can be set beforehand from the control terminal 50. The maximum number of connections 1542 is basically designated for each terminal identified by the terminal MAC 1541. However, for a certain table entity, the maximum number of connections 1542 may be designated while setting the value of terminal MAC 1541 to Don't Care (D.C), so that the total number of connections of terminals having MAC addresses not registered in the multi-connection management table 154 can be controlled within the range of the maximum number of connections specified in the D.C entry. If such a D.C entry is not prepared in the multi-connection management table 154, connection requests from user terminals having MAC addresses not registered in the multi-connection management table 154 are discarded.

FIGS. 8A to 8D illustrate an example of a structure of the load distribution management table 155 and changes in the contents of table entries.

The load distribution management table 155 comprised of a plurality of table entries, each having a MAC address 1551 of one of GWs 20. Each table entry indicates the correspondence among a GW MAC address 1551, operation priority 1552, selection priority 1553, connection ratio 1554, the maximum number of connections 1555, and the number of connections 1556. The values of GW MAC 1551, operation priority 1552, and maximum number of connections 1555 are set beforehand from the control terminal 50. The selection priority 1553 has a variable priority level that is updated each time the GW having the GW MAC 1551 is selected according to gateway selection carried out in response to a connection initiation request from any terminal.

Using the above load distribution management table 155, for example, the plurality of GWs to be the objects of load distribution can be divided into a high priority gateway group and a low priority gateway group according to the level of the operation priority 1552. In this case, by distributing the connection load within the group of high priority GWs, it is possible to operate the GWs in such a manner that the high priority GWs act as active GWs and the low priority GWs act as standby GWs, independently of the number of connections 1556 of the low priority GWs.

For example, if GWs having the highest operation priority of "1" are operated in an active mode and GWs having operation priorities of "2" and "3" are placed in standby mode, when a failure occurs in any active GW, one of the standby GWs can be switched to active mode in descending order of operation priority. Alternatively, load may be distributed among GWs having the operation priority of "1" and operating as active ones and, when all active GWs have reached a connection ratio of 100%, a GW having the operation priority of "2" is selected as the one to be connected with a user terminal.

In an illustrative embodiment, load balanced selection among the GWs is realized by changing, each time a GW is selected within the group of active GWs, the levels of selection priority 1553 for each GW according to, for example, the values of the connection ratio 1554 or the number of connections 1556, and by determining a GW for the next connection request according to these selection priority levels.

Returning to FIG. 4, when a packet is received from one of the line interfaces 11-1 to 11-n, the routing unit 12 registers the correspondence of the port number of the line interface having received the packet to the source MAC address (MAC-SA 902) of the received packet into the port management table 153 and determines whether the received packet is a communication control packet of PPPoE, as illustrated in FIG. 3, or IEEE 802.1X or the like which is not illustrated herein, from the header information of the received packet.

If the received packet is such a communication control packet, the routing unit 12 forwards the received packet and the port number of a line interface having received the packet to the control processor 14 via the receiving buffer 13R. The control processor 14 reads out the communication control packet and the port number from the receiving buffer 13R and performs gateway selection and packet processing according to a communication protocol, as will be described later. The communication control packet to be transmitted to an external line is forwarded from the control processor 14 to the routing unit 12 via the transmitting buffer 13T.

The routing unit 12 performs routing of user packets received through the line interfaces 11-1 to 11-n and communication control packets received from the control processor 14 via the transmitting buffer 13T, according to the port management table 153. Specifically, the routing unit 12 searches the port management table 153 for a table entry having a MAC address 1533 matched with the destination MAC address (MAC-DA 901) of a received packet and forwards the received packet to a particular line interface specified by the port number 1531 in the searched table entry.

If there is no table entry corresponding to the destination MAC address in the port management table 153, or if the destination address of the received packet is a broadcast or multicast address, the routing unit 12 forwards the received packet to all ports (line interfaces) other than the port having received the packet. However, if the communication control packet read out from the transmitting buffer 13T is a connection initiation request packet (EAPOL-Start packet or PADI packet), the routing unit 12 broadcasts the packet to all the ports for which the GW connection flag 1532 is in a "1" state in the port management table 153.

The types of communication control packets to be monitored by the control processor 14 are designated in the monitor target packet table 151. The control processor 14 determines whether the communication control packet read out from the receiving buffer 13R is a monitor target. If the communication control packet is not a monitor packet, the control processor 14 immediately outputs the packet to the transmitting buffer 13T. If the communication control packet read out from the receiving buffer 13R is a monitor target, the control processor 14 updates the connection management table 152 in accordance with the communication control routine 16 and outputs the communication control packet to the transmitting buffer 13T.

As will be described later, the control processor 14 according to the first embodiment connects a user terminal to a particular GW by forwarding to the user terminal one of response packets replied from a plurality of GWs 20 in response to the connection initiation request and by discarding the other response packets.

The packet forwarding apparatus (GW selector) 10 of the present invention can perform above GW selection in several ways. For example, (1) the GW selector selects, from among a plurality of response packets (EAP-Request/ID Request or PADO) transmitted from a plurality of redundant GWs in response to the same connection initiation request (EAPOL-Start or PADI), a response packet having been received first as an active one and discards the other response packets having been received subsequently; (2) the GW selector selects, from among a plurality of response packets having been received within a predetermined period of time, a response packet transmitted from a GW that is different from a previously selected GW as an active one and discards the other response packets; and (3) the GW selector previously gives a priority level to each of GWs forming a redundant GW group and selects a response packet transmitted from a GW having the highest priority level from among a plurality of response packets having been received within a predetermined period of time.

In order to distribute load among a group of redundant GWs, the methods (2) and (3) are effective. In the illustrative embodiment which will be described below, the GW selector selects a GW according to the method described in (3), based on the selection priority levels assigned to the GWs.

Next, PPPoE connection control by the GW selector of the present invention will be described with reference to FIGS. 5 to 15. Here, the connection control will be described in a case where the GW selector 10L-1 shown in FIG. 2 adopts a GW selection algorithm in which, among response packets (PADO) received from the GWs 20L-1 to 20L-4 (BASs 20LP-1 to 20LP-4), a packet received from a GW having the highest selection priority is selected as an active one and the selection priority of the GW selected this time is changed to a lower level, so that a response packet from another GW having the highest selection priority will be selected as an active one when a next connection initiation request is issued.

Figure 9:
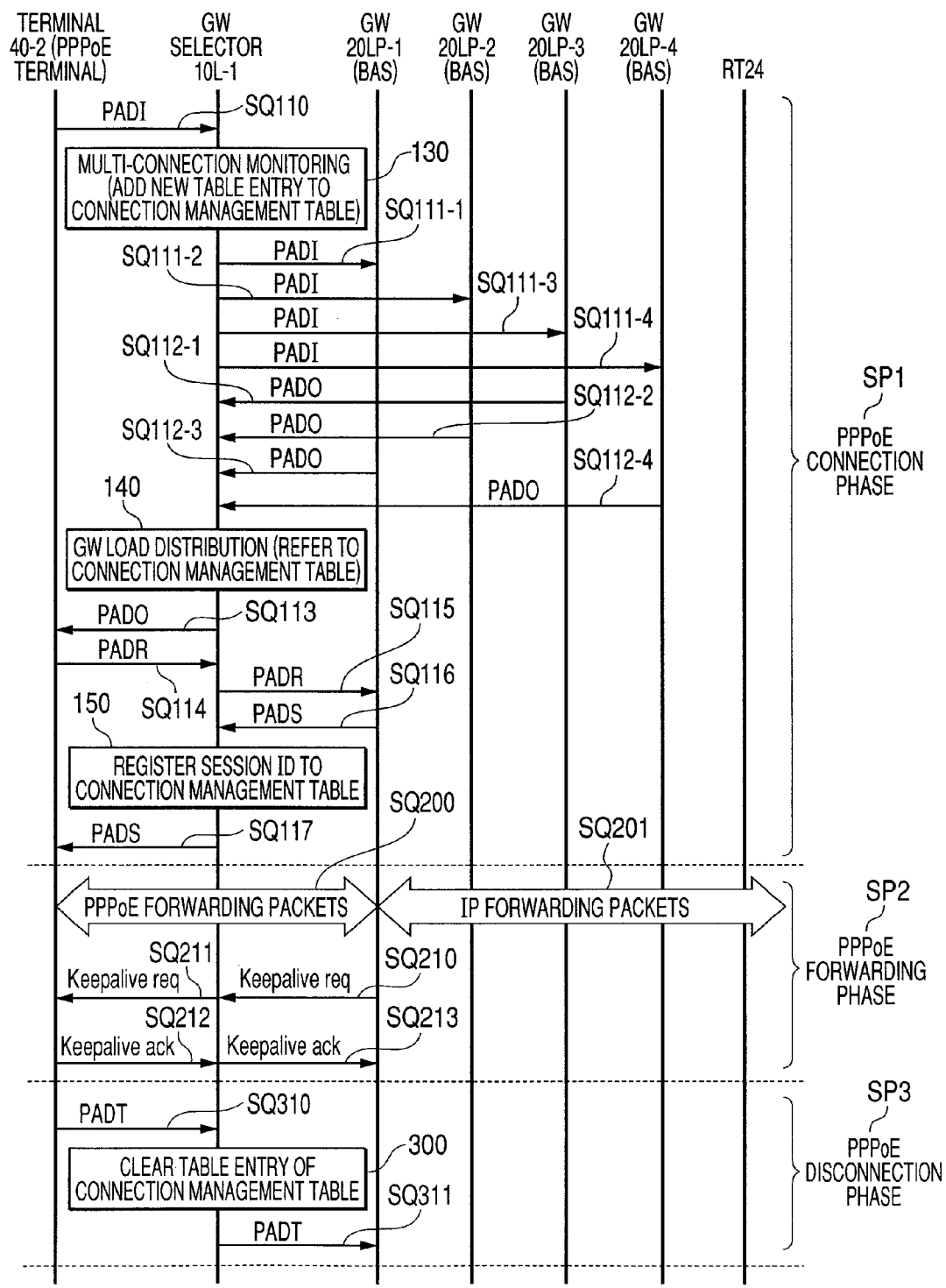
FIG. 9 is a sequence diagram illustrating PPPoE connection control performed through the GW selector 10 of the present invention.

As illustrated in FIG. 9, when a terminal (PPPoE terminal) 40-2 broadcasts a PADI packet (SQ110), a PPPoE connection phase SP1 starts. When the PADI packet is received, the routing unit 12 of the GW selector 10L-1 outputs the received packet to the receiving buffer 13R together with a port number "m" of a line interface having received the packet.

Figure 10:
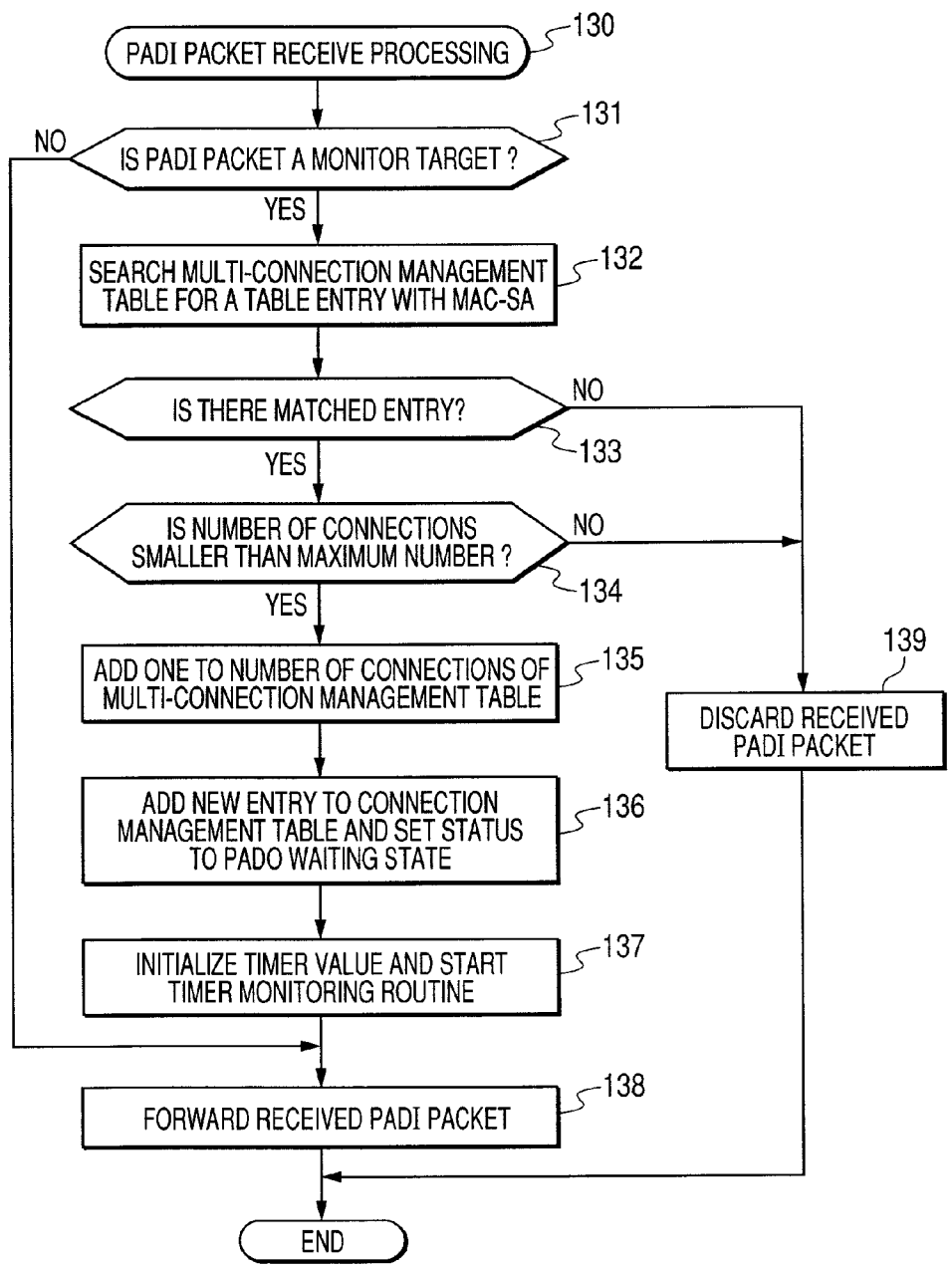
FIG. 10 is a flowchart of a PADI packet receive processing routine 130 to be executed by the GW selector 10.

Upon receiving the PADI packet, the control processor 14 executes a PADI packet receive processing routine 130 illustrated in FIG. 10. The PADI packet receive processing routine 130 constitutes a part of the communication control routine 16, together with a PADO packet receive processing routine 140, a PADS packet receive processing routine 150, a GW load distribution processing routine 160, a timer monitoring routine 170, and a PADT packet receive processing routine 300, which will be described later.

In the PADI packet receive processing routine 130, the control processor 14 determines whether PADI is specified as a monitor target packet (131) by referring to the monitor target packet table 151. If PADI is not specified as a monitor target, the control processor 14 forwards the received PADI packet to the routing unit 12 (138) via the transmitting buffer 13T and exits this routine.

In the present embodiment, it is assumed that PADI is specified as a monitor target. In this case, the control processor 14 searches the multi-connection management table 154 for a table entry including a terminal MAC address 1541 matched with a value "00-00-00-00-00-02" of the source MAC address (MAC-SA 902) of the received packet (132).

As a result of the table search (133), if a table entry corresponding to the MAC-SA of the received packet is not found, the control processor 14 discards the received packet (139) and exits this routine. If a table entry corresponding to the MAC-SA of the received packet is found, the control processor 14 regards the PADI as a connection request that was transmitted for establishing another connection in the form of multi-connection from the same user and compares the number of connections 1543 and the maximum number of connections 1542 (134). If the number of connections 1543 is equal to or greater than the maximum number of connections 1542, the control processor 14 discards the received packet (139) and exits this routine.

If the number of connections 1543 is less than the maximum number of connections 1542, the control processor 14 adds one to the number of connections 1543 in the retrieved table entry (135) and registers a new table entry ENm into the connection management table 152 (136). As illustrated in FIG. 5A, the table entry ENm includes, as the terminal port 1521, the port number "m" notified from the routing unit 12, the source MAC address "00-00-00-00-00-02" of the received packet as the terminal MAC 1522, and PADO waiting state as the status 1525. Next, the control processor 14 initializes the timer value 1526 in the table entry ENm to a predetermined value and starts the timer monitoring routine 170 (137), which will be described later with FIG. 13. After that, the control processor 14 forwards the received PADI packet to the transmitting buffer 13T (138) and exits this routine.

Upon receiving the PADI packet from the control processor 14, the routing unit 12 broadcasts the PADI packet to a plurality of line interfaces connected to the GWs, according to the table entries having the GW connection flag 1532 set to "1" in the port management table 153 (SQ111-1 to SQ111-4).

The BASs 20LP-1 to 20LP-4 reply PADO packets in response to the above PADI packet, respectively (SQ112-1 to SQ112-4). The destination MAC address (MAC-DA 901) of the PADO packets indicate the MAC address "00-00-00-00-00-02" of the PPPoE terminal 40-2.

The routing unit 12 of the GW selector 10L-1 outputs the first received PADO packet transmitted, for example, from the GW (BAS) 20LP-3 and a port number "5" indicating the line interface having received the PADO packet to the receiving buffer 13R. The second received PADO packet transmitted from the GW (BAS) 20LP-2 is output to the receiving buffer 13R together with a port number "n" indicating the line interface having received the packet. The third received PADO packet transmitted from the GW (BAS) 20LP-1 is output to the receiving buffer 13R together with a port number "4" indicating the line interface having received this packet. The last received PADO packet transmitted from the GW (BAS) 20LP-4 is output to the receiving buffer 13R together with a port number "k" indicating the line interface having received this packet.

Figure 11:
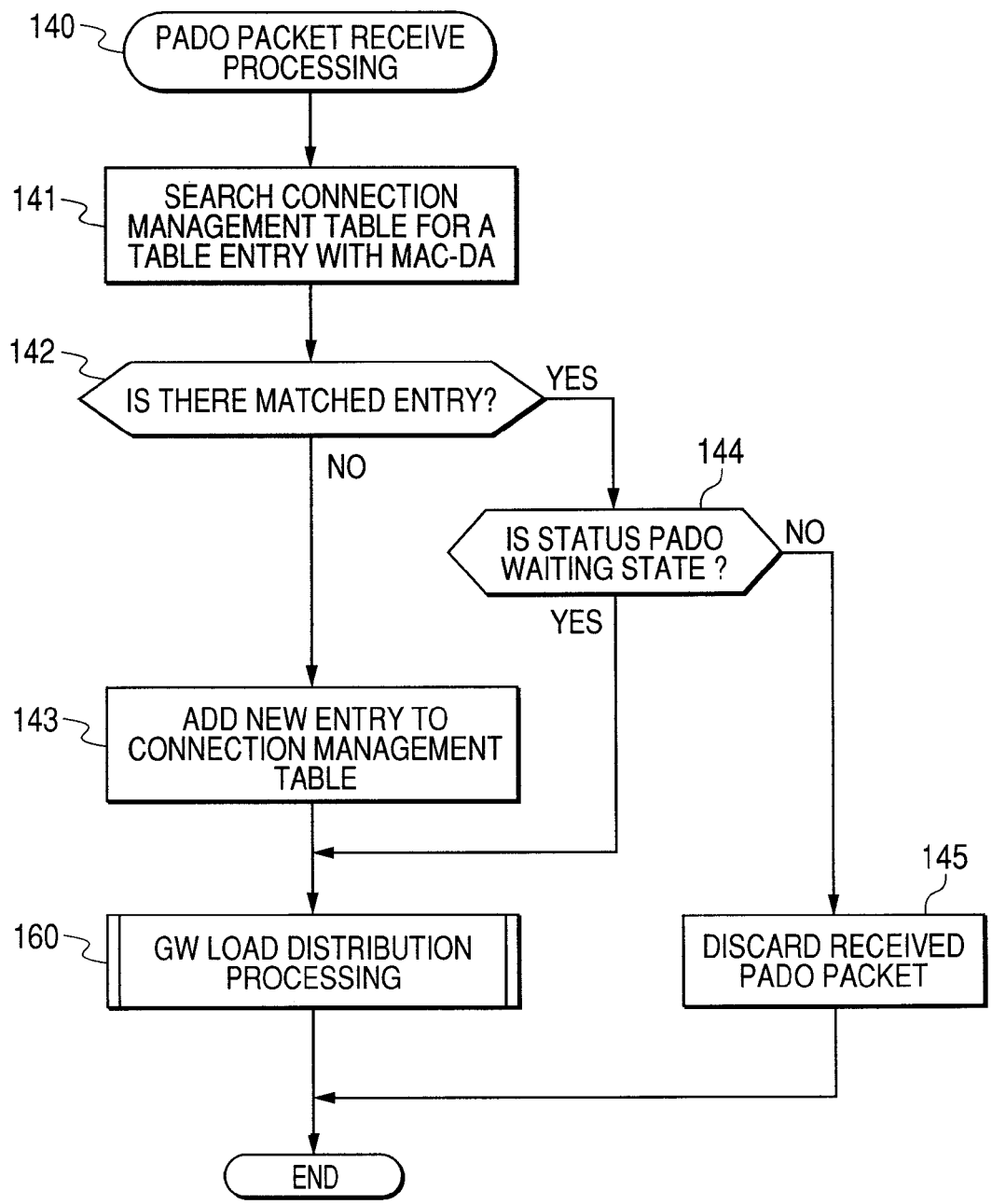
FIG. 11 is a flowchart of a PADO packet receive processing routine 140 to be executed by the GW selector 10.

Upon reading out the PADO packet transmitted from the GW (BAS) 20LP-3 from the receiving buffer 13R, the control processor 14 executes a PADO packet receive processing routine 140 illustrated in FIG. 11. First, the control processor 14 searches the connection management table 152 for a table entry including a terminal MAC 1522 matched with the value "00-00-00-00-00-02" of the destination MAC address (MAC-DA 901) of the PADO packet (141).

As a result of the table search (142), if a table entry ENm matched with the destination MAC address is found, the control processor 14 judges whether the status 1525 in the table entry ENm is PADO waiting state (144). If the status 1525 is other than PADO waiting state, the control processor 14 regards the received PADO packet as an invalid packet, discards the received packet (145), and exits this routine.

In the present example, as shown in FIG. 5A, the status 1525 is PADO waiting state in the table entry ENm retrieved from the connection management table 152. Then, the control processor 14 executes a GW load distribution processing routine 160 illustrated in FIG. 12.

By the way, if PADI was not specified as a monitor target packet, registration of a table entry ENm having the terminal MAC address "00-00-00-00-00-02" into the connection management table 152 is not performed in the PADI packet receive processing 130 described in FIG. 10. In this case, the control processor 14 fails in searching a table entry matched with the destination MAC address.

When having failed in searching a table entry looked for in the connection management table 152, the control processor 14 creates a new table entry ENm based on the PADO packet, registers the table entry into the connection management table 152 (143), and executes the GW load distribution processing routine 160.

The table entry ENm created this time includes the value "00-00-00-00-00-02" of the destination MAC address (MAC-DA 901) in the received PADO packet as the terminal MAC 1522, the value "00-00-00-22-22-03" of the source MAC address (MAC-SA 902) of the PADO packet as the GW MAC 1524, and the port number "m" corresponding to the above destination MAC address "00-00-00-00-00-02" in the port management table 153 as the terminal port 1521. The value of terminal port 1521, however, may be omitted.

Figure 12:
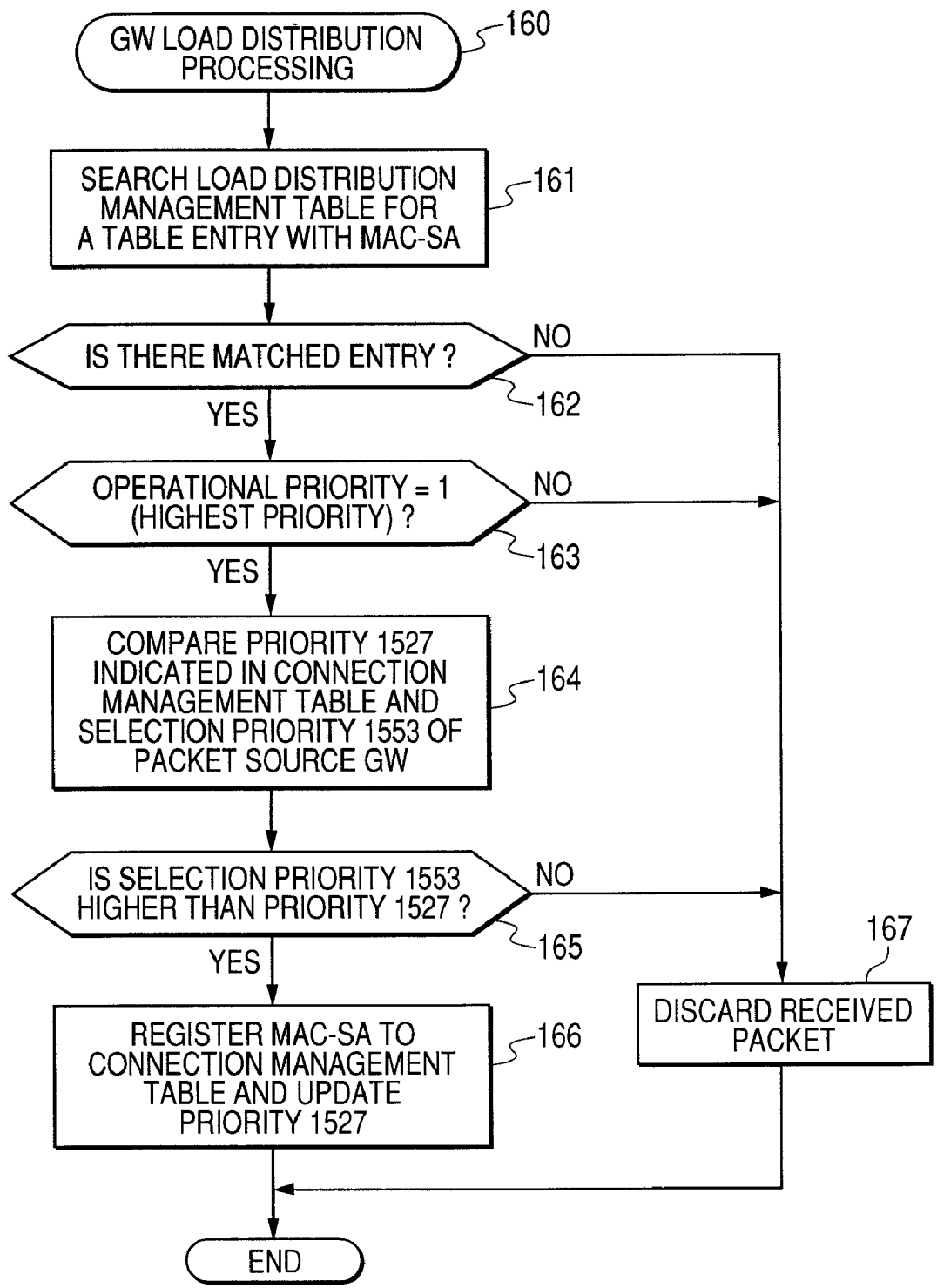
FIG. 12 is a flowchart of a load distribution processing routine 160 to be executed by the GW selector 10.

As illustrated in FIG. 12, in the GW load distribution processing routine 160, the control processor 14 searches the load distribution management table 155 for a table entry including a GW MAC 1551 matched with the value "00-00-00-22-22-03" of the source MAC address (MAC-SA 902) in the received PADO packet (161).

As a result of the table search (162), if no entry matched with the source MAC address was found, the control processor 14 regards the received PADI packet as a packet transmitted from an unregistered invalid GW, discards the received packet (167), and exits the GW load distribution processing routine 160. When the processor terminates the GW load distribution processing routine 160, the PADO packet receive processing routine 140 shown in FIG. 11 is terminated as well.

If a table entry matched with the source MAC address of the received packet is found from the load distribution management table 155, the control processor 14 judges whether the level of the operation priority 1552 in the retrieved table entry is the highest priority "1" (163). If the operation priority level is not "1", the control processor 14 regards the received packet as the one transmitted from a standby GW, discards the received packet (167), and exits the GW load distribution processing routine 160. If the operation priority level is "1", the control processor 14 compares the selection priority 1553 level specified in the table entry and the priority 1527 level specified in the connection management table 152 (164).

In the present example, as the operation priority 1552 level is the highest level "1", the control processor 14 compares the selection priority 1553 level specified in the table entry and the priority 1527 level specified in the table entry ENm in the management table 152 (164).

When the received packet is the first received PADO packet addressed to the terminal 40-2 (terminal MAC: "00-00-00-00-00-02"), the priority 1527 level is not set in the table entry ENm, as shown in FIG. 5A. In this case, the control processor 14 determines that the selection priority 1553 level is higher than the priority 1527 level (165) and registers, as shown in FIG. 5B, the address value "00-00-00-22-22-03" of the GW 20LP-3 specified in the source MAC address (MAC-SA 902) of the received packet (PADO) to the GW MAC 1524 of the table entry ENm, sets the selection priority 1553 level "12" to the priority 1527, and sets the port number "5" of the line interface having received the PADO packet to the GW port number 1523 (166).

At this time, the GW (BAS) 20LP-3 becomes a candidate GW for connecting with the terminal 40-2. The control processor 14 exits the GW load distribution processing routine, holding the PADO packet received from the GW (BAS) 20LP-3 in a forwarding wait state.

In the example shown in FIG. 9, the PADO packet transmitted from the GW (BAS) 20LP-2 is received as the second PADO packet (SQ112-2). When the PADO packet from the GW (BAS) 20LP-2 and the port number are read out from the receiving buffer 13R, the control processor 14 executes the PADO packet receive processing routine 140 and executes the GW load distribution processing routine 160 through a similar process as for the first PADO packet. At this time, a table entry having a value "00-00-00-22-22-02" as the GW MAC 1551 is retrieved from the load distribution management table 155 (161). Because the operation priority 1552 of the GW (BAS) 20LP-2 is set to "2" in this table entry, the judging result of step 163 is NO. Then, the control processor discards the received packet (167) and exits the GW load distribution processing routine.

Likewise, when the PADO packet received from the GW (BAS) 20LP-1 is read out as the third PADO packet from the receiving buffer 13R, a table entry having a value "00-00-00-22-22-01" as the GW MAC 1551, as illustrated in FIG. 8A, is retrieved from the load distribution management table 155. From the retrieved table entry, the processor knows that the GW (BAS) 20LP-1 has the operation priority level "1" and its selection priority 1553 is "11", and judges that the GW (BAS) 20LP-1 has a higher selection priority than the priority level "12" of the candidate GW registered in the connection management table 152.

Thus, in the GW load distribution processing routine 160 executed when the above PADO packet is received, the control processor 14 selects the GW (BAS) 20LP-1 as a new candidate GW replacing the GW (BAS) 20LP-3 and updates the values of the GW port 1523, GW MAC 1524, and priority 1527 in the table entry ENm of the connection management table 152, as illustrated in FIG. 5C (166). In this case, the control processor 14 discards the PADO packet received from the GW (BAS) 20LP-3, which has so far been held, and exits the GW load distribution processing routine, holding the PADO packet received from the GW (BAS) 20LP-1 in a forwarding wait state.

When a PADO packet received from the GW (BAS) 20LP-4 is read out as the fourth PADO packet from the receiving buffer 13R, a table entry having a value "00-00-00-22-22-04" as the GW MAC 1551, as illustrated in FIG. 8A, is retrieved from the load distribution management table 155. From the table entry, the processor knows that the GW (BAS) 20LP-4 has the operation priority level "1" and the value of selection priority 1553 is "13", and that the selection priority of the GW 20LP-4 is lower than the priority level "11" of the candidate GW specified in the table entry ENm of the connection management table 152.

Thus, in the GW load distribution processing routine 160 executed when the above PADO packet is received, the control processor 14 discards the received packet (167) and exits the GW load distribution processing routine, holding the PADO packet received from the GW (BAS) 20LP-1 in a forwarding wait state.

Figure 13:
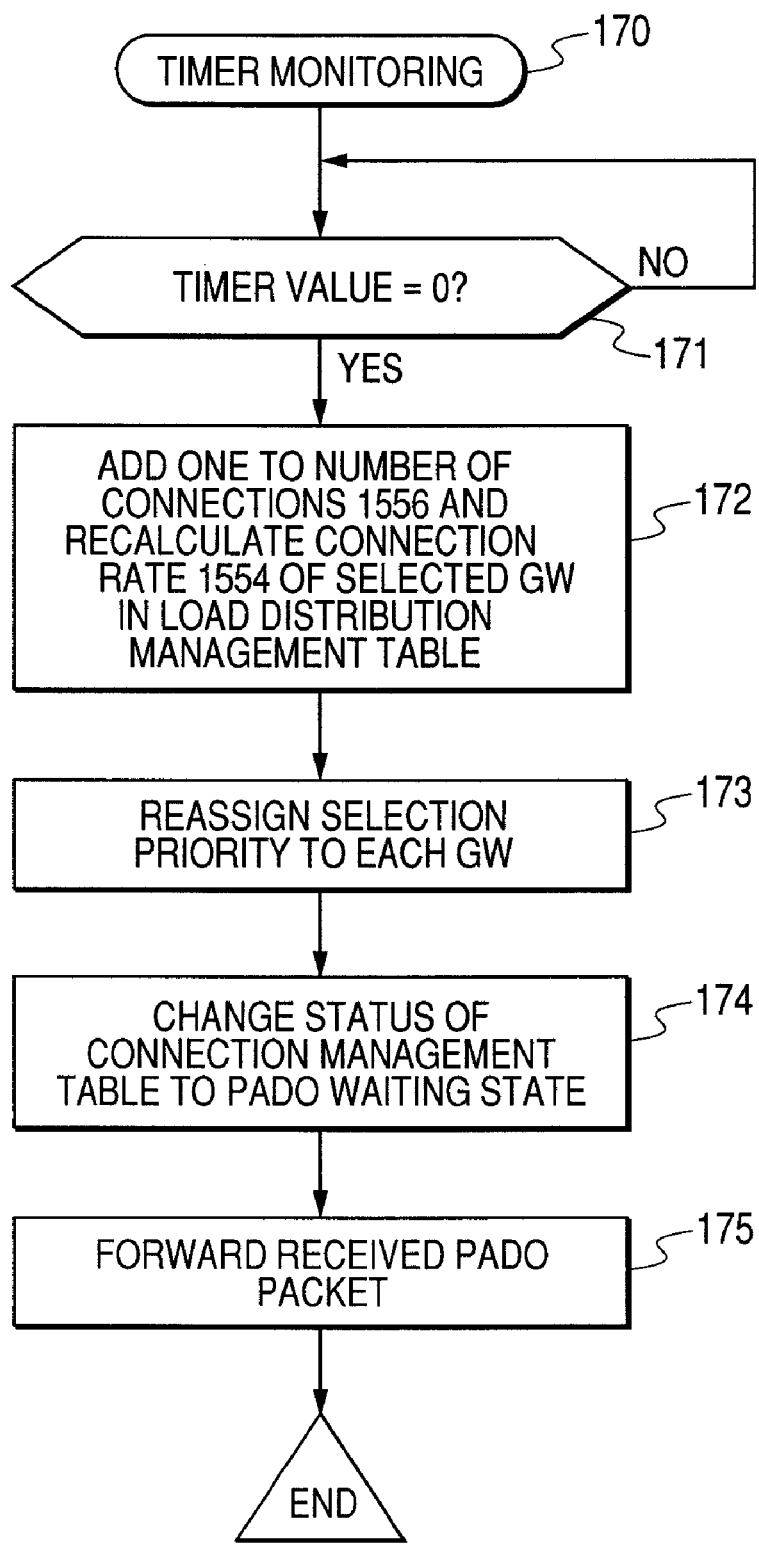
FIG. 13 is a flowchart of a timer monitoring routine 170 to be executed by the GW selector 10.

FIG. 13 shows a flowchart of the timer monitoring routine 170.

The timer monitoring routine 170 is activated when a PADI packet is received and executed periodically by the control processor 14 in parallel with the PADO packet receive processing routine 140 and GW load distribution processing routine 160.

In the timer monitoring routine 170, the control processor 14 waits for expiry (timeout) of the timer value 1526 set in the table entry ENm of the connection management table 152 (171). Upon detecting the timeout of the timer value 1526, the control processor 14 adds one to the number of connections 1556 and recalculates the connection ratio 1554 in a table entry of the load distribution management table 155 (172). The table entry is corresponding to the MAC address of the GW selected this time, that is, the MAC address 1524 of the candidate GW specified in the table entry ENm of the connection management table 152.

Next, the control processor 14 reassigns selection priority 1553 in ascending order of connection ratio 1554 or the number of connections 1556 in a plurality of table entries having a value "1" as the operation priority 1552 registered in the load distribution management table 155 (173).

In the present example, by executing step 172, as shown in FIG. 8B, the value of the number of connections 1556 is changed from "999" to "1000" and the value of connection ratio 1554 is changed from "19.98" to "20.00" in the table entry having GW MAC 1551 "00-00-00-22-22-01" for the GW which remains as the candidate GW. By executing step 173, as shown in FIG. 8B, the level of selection priority 1553 of the GW MAC 1551 "00-00-00-22-22-01" is changed from "11" to "13", and levels of selection priority 1553 of GW MAC 1551 "00-00-00-22-22-03" and "00-00-00-22-22-04" are changed from "12" to "11" and from "13" to "12", respectively, for the GWs remaining as candidate GWs.

Upon completing the reassignment of selection priority 1553, the control processor 14 changes, as shown in FIG. 5D, the status 1525 in the table entry ENm of the connection management table 152 to PADS waiting (174), forwards the PADO packet, which was received from the candidate GW and held in a transmission waiting state, to the transmitting buffer 13T (175), and exits this routine.

If, the number of connections 1556 of the candidate GW indicated in the load distribution table 155 has reached the maximum number of connections 1555 as the result of execution of step 172, the candidate GW cannot accept a new connection request. In this case, the selection priority 1553 of this GW is set at the lowest level value until the number of connections 1556 decreases, so that, by judging the selection priority in step 163 of the GW load distribution processing routine 160, a PADO from the GW whose selection priority is the lowest level can be discarded. As the lowest level value, a value with the lowest position digit of "0", for example, "10", "20", etc. may be used.

In the GW load distribution processing routine 160 illustrated in FIG. 12, all PADO packets received from GWs whose operation priority 1552 is not "1" are discarded. However, if the number of connections 1556 has reached the maximum number of connections 1555 for all active GWs whose operation priority 1552 is set to "1", that is, when their selection priority levels were set at the lowest level, one or more GWs whose operation priority is set to "2" may be added to the GW group within which load distribution is carried out. This means that, when the result of the decision at step 163 is NO in the GW load distribution processing routine 160, the control processor 14 checks the selection priority 1553 level in all the table entries having level "1" of the operation priority 1552 in the load distribution management table 155, and executes step 164 if all the selection priority 1553 level has been set to the lowest level value.

Upon receiving the PADO packet from the control processor 14 via the transmitting buffer 13T, the routing unit 12 refers to the port management table 153 based on the destination MAC address (MAC-DA 901) of the received packet. In the present example, the destination MAC address of the PADO packet is "00-00-00-00-00-02" and the port management table 153 designates, as shown in FIG. 6, the port number "m" for connection to the PPPoE terminal 40-2 as the port number 1531 corresponding to the MAC address "00-00-00-00-00-02". The routing unit 12 transmits, therefore, the PADO packet through the line interface having the port number "m" (SQ113).

Upon receiving the PADO packet, the PPPoE terminal 40-2 transmits a PADR packet addressed to the GW (BAS) 20LP-1 which is the source of the PADO packet (SQ114). In the present embodiment, as illustrated in FIG. 5D, the status 1525 of the table entry ENm corresponding to the terminal 40-2 is set into a waiting state of PADS to be replied in response to the PADR, in the connection management table 152. Thus, when the PADR packet was received from the routing unit 12, because the PADR packet is excluded from the monitor targets of the GW selector 10L-1, the control processor 14 of the GW selector 10L-1 immediately forwards this packet to the routing unit 12. Upon receiving the PADR packet, the routing unit 12 routes this received packet according to the port management table 153.

The destination MAC address (MAC-DA 901) of the PADR packet indicates the MAC address "00-00-00-22-22-01" of the GW (BAS) 20LP-1 and the port management table 153 stores a port number "4" of a connection line for the GW (BAS) 20LP-1 in association with the value of the above destination MAC address. The PADR packet is forwarded, therefore, to the GW (BAS) 20LP-1 through the line interface 11-4 (SQ115).

The GW (BAS) 20LP-1 replies a PADS packet in response to the PADR (SQ116). Upon receiving the PADS packet, the routing unit 12 of the GW selector 10L-1 outputs it to the receiving buffer 13R, together with the port number "4" of the line interface having received the RADS packet.

Figure 14:
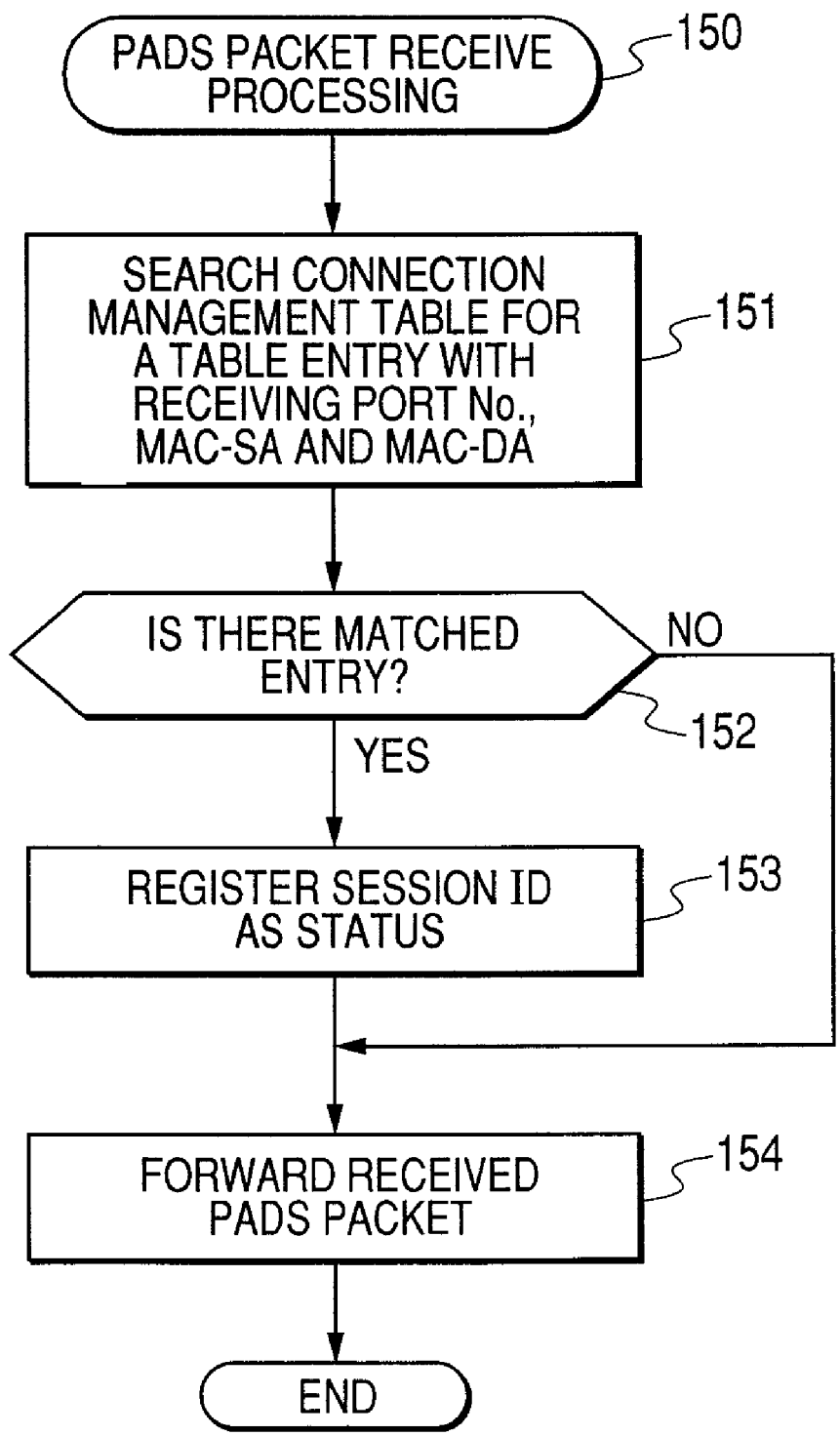
FIG. 14 is a flowchart of a PADS packet receive processing routine 150 to be executed by the GW selector 10.

Upon receiving the PADS packet, the control processor 14 executes a PADS packet receive processing routine 150 illustrated in FIG. 14.

In the PADS packet receive processing routine 150, the control processor 14 searches the connection management table 152, using a search key comprising the port number "4" notified from the routing unit 12 and the destination MAC address "00-00-00-00-00-02" (MAC-DA 901) and the source MAC address "00-00-00-22-22-01" (MAC-SA 902) of the received packet, for a table entry including a GW port 1523, terminal MAC 1522, and GW MAC 1554 matched with respective key items of the search key (151).

If a table entry ENm matched with the search key is found as a result of the table search (152), the control processor 14 sets, as the status 1525 of the above table entry, the value of a session ID ("1,000" in this example) specified in the received PADS packet (153), as illustrated in FIG. 5E, forwards the PADS to the routing unit 12 via the transmitting buffer 13T (154), and exits this routine.

Because the destination address (MAC-DA 901) of the above PADS packet is "00-00-00-00-00-02", the routing unit 12 forwards the PADS packet to a line interface having a port number "m" designated by the port management table 153 shown in FIG. 6, whereby the PADS packet is transmitted to the PPPoE terminal 40-2 (SQ117).

If there is no table entry matched with the search key in the connection management table 152, the control processor forwards the received PADS to the routing unit 12 (154) and exits this routine. This event occurs in such a case that, for example, a table entry has been deleted automatically when the control processor 14 detects that a session having a session ID indicated in the table entry ceases communication for more than a predetermined period of time.

Upon receiving the PADS packet, the communication phase of the PPPoE terminal 40-2 shifts from the PPPoE connection phase SP1 to a PPPoE forwarding phase SP2.

During the PPPoE forwarding phase SP2, the GW selector 10L-1 forwards user packets (SQ200) and Keepalive packets (SQ210 to 213) communicated between the PPPoE terminal 40-2 and the GW (BAS) 20LP-1.

During the PPPoE forwarding phase SP2, the GW (BAS) 20LP-1 converts PPPoE packets received from the PPPoE terminal 40-2 (SQ200) via the GW selector 10L-1 into IP packets and forwards them to the router 24 (SQ201). The GW (BAS) 20LP-1 also converts IP packets received from the router 24 (SQ201) into PPPoE packets and forwards them to the PPPoE terminal 40-2 (SQ200) via the GW selector 10L-1. The GW (BAS) 20LP-1 issues a Keepalive request periodically (SQ210) and makes sure of the operating state of the PPPoE terminal 40-2 by receiving a response packet (Keepalive acknowledge) from the terminal.

When the terminal user terminates the access to the Internet, a connection termination packet PADT addressed to the GW (BAS) 20LP-1 is transmitted from the PPPoE terminal 40-2 (SQ310) and the communication phase shifts from the PPPoE forwarding phase SP2 to a PPPoE disconnection phase SP3.

Figure 15:
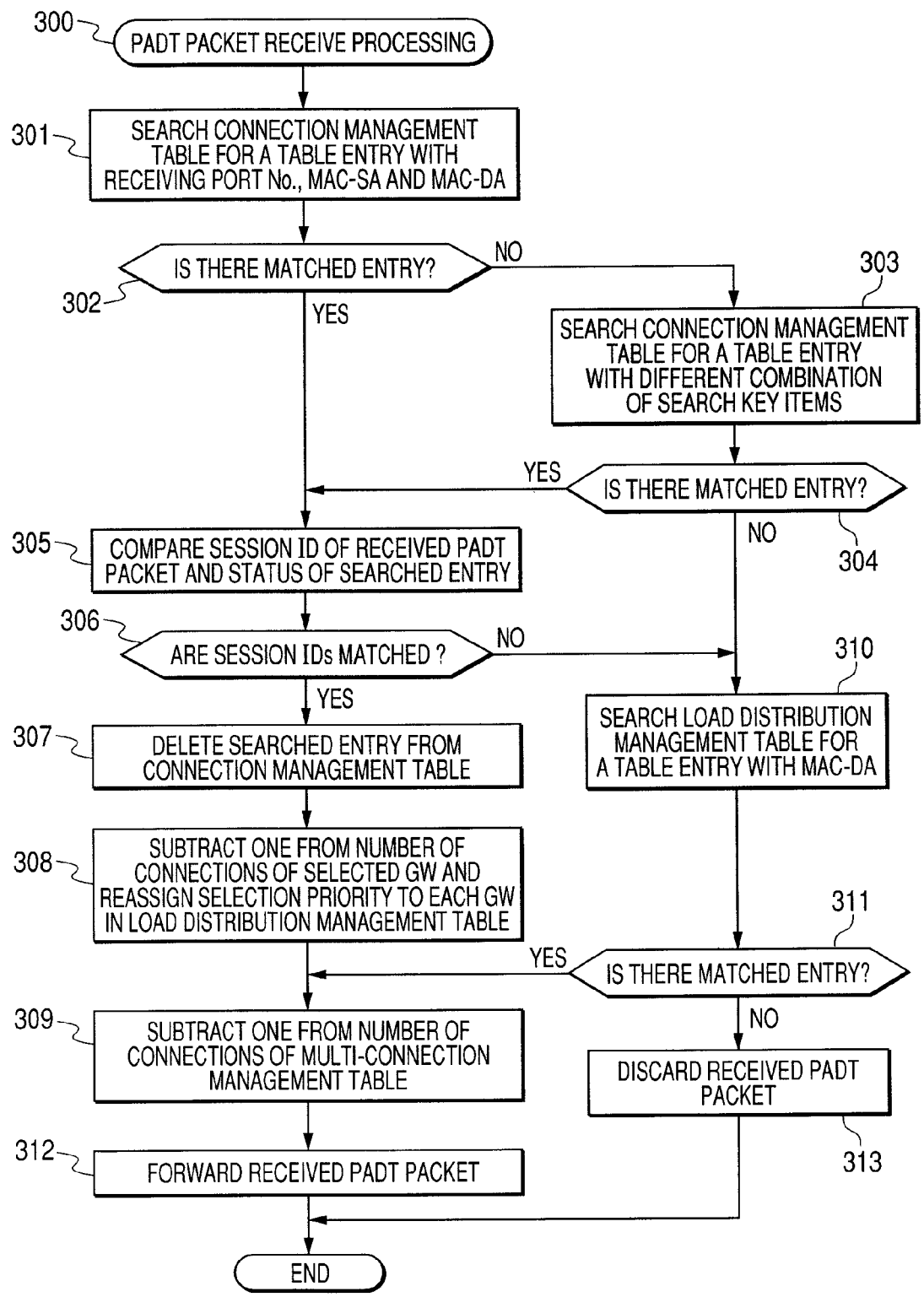
FIG. 15 is a flowchart of a PADT packet receive processing routine 300 to be executed by the GW selector 10.

When the GW selector 10L-1 receives the PADT packet, the routing unit 12 executes a PADT packet receive processing routine 300 illustrated in FIG. 15. In the PADT packet receive processing routine 300, the control processor 14 searches the connection management table 152 using a search key comprising the port number "m" of a line interface having received the PADT packet and the source MAC address "00-00-00-00-00-02" (MAC-SA 902) and the destination MAC address "00-00-00-22-22-01" (MAC-DA 901) of the received packet, for a table entry having the terminal port 1521, terminal MAC 1522, and GW MAC 1524 matched with respective key items of the above search key (301). The port number, however, may be excluded from the search key items.

As a result of the search (302), if a table entry ENm matched with the search key is found, the control processor 14 judges whether the value of the session ID designated by the status 1525 in the table entry coincides with the session ID value "1,000" specified as the session ID 922 in the received PADT packet (305).

If it was found that the two session IDs coincide with each other as the result of the decision (306), the control processor 14 deletes the table entry ENm from the connection management table 152 (307), as illustrated in FIG. 5F, and decrements, in the table entry having the address value "00-00-00-22-22-01" as GW MAC 1551 in the load distribution management table 155, the value of the number of connections 1556 by one and recalculates the connection ratio 1554. After that, the control processor 14 performs reassignments of selection priority 1553 for active GWs in ascending order of the number of connections 1556 or connection ratio 1554 (308).

When the contents of the load distribution management table 155 are in a state shown in FIG. 8C, for example, the selection priority is changed, by executing the step 308, from "10" to "11" in the table entry having the address value "00-00-00-22-22-01" as the GW MAC 1551, as shown in FIG. 8D.

The control processor 14 then decrements the value of the number of connections 1543 by one (309) in the entry having the address value "00-00-00-00-00-01" as the terminal MAC 1541 in the multi-connection management table 154, forwards the received packet to the routing unit 12 via the transmitting buffer 13T (312), and exits this routine.

If the session IDs do not coincide with each other in the judging step 306, the control processor 14 searches the load distribution management table 155, using the value "00-00-00-22-22-01" of the destination MAC address (MAC-DA 901) as a search key, for a table entry having the GW MAC 1551 matched with the search key (310). As a result of the table search (311), if the table entry looked for is found, the control processor 14 executes the steps 309 and 312. If the table entry looked for is not found, the control processor 14 regards the received PADT packet as irrelevant to itself, discards the received packet (313), and exits this routine.

If the received packet is a PADT packet issued from the GW (BAS) 20LP-1 side, it turns out in the judging step 302 that the table entry looked for is not in the connection management table 152, as the result of searching the connection management table 152. In this case, the control processor 14 changes the combination of search key items and searches the connection management table 152, using the destination MAC address (MAC-DA 901) "00-00-00-00-00-02" of the received packet, port number "4", and source MAC address (MAC-SA 902) "00-00-00-22-22-01" of the received packet as a new search key, for a table entry having the terminal MAC 1522, GW port 1523, and GW MAC 1524 matched with respective key items of the search key (303).

As a result of the table search (304), if the table entry looked for is found, the control processor 14 executes the steps 305 to 311 described above. If the table entry looked for is not found, the control processor 14 searches the load distribution management table 155, using the source MAC address (MAC-SA 902) "00-00-00-22-22-01" as a search key, for a table entry having the GW MAC 1551 matched with the search key (310), executes the steps 309 to 312 or step 313 depending on the result of table search, and exits this routine.

Upon receiving the PADT packet from the control processor 14, the routing unit 12 specifies the port number 1531 of an output port (line interface) from the port management table 153 and forwards the PADT packet to the BAS 20LP-1 via the output port (SQ311).

In the above-described embodiment, the control processor 14 determines whether each communication control packet received is a monitor target packet by referring to the monitor target packet table 151, but this determination may be performed by the routing unit 12 so that the routing unit 12 selectively forwards only communication control packets to be monitor targets to the control processor 14. Further, in the above-described embodiment, the processing for gateway selection is performed by the control processor 14, but the function of the control processor 14 described in the embodiment may be implemented in the routing unit 12, if it poses no problem in the processing performance of the routing unit 12.

As can be appreciated from the above-described embodiment, according to the present embodiment, the packet forwarding apparatus (GW selector) broadcasts a connection initiation request packet received from a PPPoE terminal 40 to a plurality of redundant GWs (BASs), takes only one response packet received from a particular GW as the active one, that is selected from among a plurality of response packets received within a predetermined period of time in accordance with a predetermined gateway selection algorithm (load distribution algorithm), and forwards the selected packet to the requester terminal. The PPPoE terminal 40 carries out the subsequent communication control procedure with the particular GW having transmitted the selected response packet. According to the packet forwarding apparatus (GW selector) of the present invention, therefore, load distribution among the redundant GWs (BASs) can be accomplished independently of implementation on PPPoE terminals 40. Furthermore, it is not necessary to add a special function, e.g., as introduced in Patent Document 1, to each GW (BAS).

While the procedure for controlling a connection between a PPPoE terminal 40 and one of redundant GWs (BASs) has been described in the embodiment, the features of the GW selector of the present invention can be applied to the procedure for controlling a connection between a supplicant (user terminal) and an authenticator (GW) in IEEE 802.1X. In the latter case, an EAPOL-Start packet is used as a connection initiation request packet, and an EAP-Request/ID Request packet and an EAPOL-logoff packet are used as a response packet from the GW (authenticator) and a disconnection request packet, respectively. Accordingly, the protocol processing unit should be provided with an EAPOL-Start packet receive processing routine corresponding to the PADI packet receive processing routine 130, an EAP-Request/ID Request packet receive processing routine corresponding to the PADO packet receive processing routine 140, and an EAPOL-logoff packet receive processing routing corresponding to the PADT packet receive processing routine 300.

Furthermore, by providing the protocol processing unit with a function of discriminating communication protocols so as to execute a processing routine for PPPoE when a PPPoE packet such as PADI is received, and to execute a processing routine for IEEE 802.1X when a packet for IEEE 802.1X such as an EAPOL-Start packet is received, it is able to coexist diverse user terminals using different communication protocols, such as PPPoE terminals and EAPOL terminals (supplicants) in IEEE 802.1X, in a same layer-2 access network. In this case, the connection management table 152 may include table entries for IEEE 802.1X (EAPOL) in addition to table entries for PPPoE shown in FIG. 5.

What is claimed is:

1. A packet forwarding apparatus being located between a plurality of user terminals and a plurality of redundant gateways connected to a transit network for the Internet, the packet forwarding apparatus comprising:
   a plurality of line interfaces each for communicating with one of said user terminals or one of said redundant gateways through connection lines; and
   a protocol processing unit for controlling forwarding of user packets and communication control packets among said plurality of line interfaces,
   said protocol processing unit having a load distribution management table for storing connection load status information of each of said redundant gateways in association with an identifier of the gateway,
   wherein said protocol processing unit is configured to receive a connection initiation request packet transmitted from one of said user terminals to connect the user terminal to said transit network, forward the connection initiation request packet to said plurality of redundant gateways, receive a plurality of response packets replied from said redundant gateways in response to the connection initiation request packet within a predetermined period of time, forward only one response packet transmitted from particular one of said redundant gateways to the user terminal which is the source of said connection initiation request packet, and forward communication control packets and user packets subsequently received from the user terminal to said particular gateway,
   wherein said response packet to be forwarded to the user terminal is selected from among said plurality of response packets according to the connection load status information stored in said load distribution management table,
   wherein the connection load status information stored in said load distribution management table includes the maximum number of connections acceptable by each of said redundant gateways and the number of existing connections being connected with the gateway at present, and
   wherein said protocol processing unit specifies said response packet to be forwarded to said user terminal by selecting said particular gateway based on a connection ratio determined for each gateway by the maximum number of connections and the number of existing connections.

2. A packet forwarding apparatus being located between a plurality of user terminals and a plurality of redundant gateways connected to a transit network for the Internet, the packet forwarding apparatus comprising:
   a plurality of line interfaces each for communicating with one of said user terminals or one of said redundant gateways through connection lines; and
   a protocol processing unit for controlling forwarding of user packets and communication control packets among said plurality of line interfaces,
   said protocol processing unit having a load distribution management table for storing connection load status information of each of said redundant gateways in association with an identifier of the gateway,
   wherein said protocol processing unit is configured to receive a connection initiation request packet transmitted from one of said user terminals to connect the user terminal to said transit network, forward the connection initiation request packet to said plurality of redundant gateways, receive a plurality of response packets replied from said redundant gateways in response to the connection initiation request packet within a predetermined period of time, forward only one response packet transmitted from particular one of said redundant gateways to the user terminal which is the source of said connection initiation request packet, and forward communication control packets and user packets subsequently received from the user terminal to said particular gateway, wherein said response packet to be forwarded to the user terminal is selected from among said plurality of response packets according to the connection load status information stored in said load distribution management table, wherein the connection load status information stored in said load distribution management table includes the maximum number of connections acceptable by each of said redundant gateways, the number of existing connections being connected with the gateway at present, the connection ratio determined by the maximum number of connections and the number of existing connections, and a connection priority, and wherein said protocol processing unit updates, each time said particular gateway was selected, the number of connections and the connection ratio of the particular gateway in said load distribution management table, calculates a new selection priority level for each of said gateways based on the updated connection ratio of the particular gateway and the connection ratios of the other gateways, stores the new selection priority level as said selection priority for each of said gateways in said load distribution management table, thereby to select a new particular gateway in response to a new connection initiation request packet based on the selection priority levels of said gateways stored in the load distribution management table.

3. The packet forwarding apparatus according to claim 2, wherein:

said protocol processing unit is provided with a connection management table comprising a plurality of table entries each for storing, in association with an identifier of the user terminal which is the source of a connection initiation request packet, a selection priority of a gateway selected as a candidate gateway having a possibility of connecting with the user terminal, the protocol processing unit registers, into the connection management table when the connection initiation request packet was received, a new table entry including the user terminal identifier extracted from a header of the received packet, compares, each time a response packet replied from one of said redundant gateways in response to the connection initiation request packet was received, the selection priority of a source gateway, which is the source of the response packet, indicated in the load distribution management table and the selection priority indicated in a table entry corresponding to a destination user terminal of the response packet in the connection management table, registers the selection priority of the source gateway into the table entry if the selection priority is not registered in the table entry or if the level of the selection priority of the source gateway is higher than the selection priority registered in the table entry, and holds the response packet in a transmission waiting state, and the protocol processing section forwards the response packet having been held to the user terminal that transmitted the connection initiation request packet upon elapse of said predetermined period of time.

4. The packet forwarding apparatus according to claim 3, wherein:

said protocol processing unit sets a timer value for measuring said predetermined period of time in a table entry when registering the table entry into the connection management table, and forwards said response packet to said user terminal having transmitted the connection initiation request packet when timeout of the timer value is detected.

5. A packet forwarding apparatus being located between a plurality of user terminals and a plurality of redundant gateways connected to a transit network for the Internet, the packet forwarding apparatus comprising:

a plurality of line interfaces each for communicating with one of said user terminals or one of said redundant gateways through connection lines; and a protocol processing unit for controlling forwarding of user packets and communication control packets among said plurality of line interfaces, said protocol processing unit having a load distribution management table for storing connection load status information of each of said redundant gateways in association with an identifier of the gateway, wherein said protocol processing unit is configured to receive a connection initiation request packet transmitted from one of said user terminals to connect the user terminal to said transit network, forward the connection initiation request packet to said plurality of redundant gateways, receive a plurality of response packets replied from said redundant gateways in response to the connection initiation request packet within a predetermined period of time, forward only one response packet transmitted from particular one of said redundant gateways to the user terminal which is the source of said connection initiation request packet, and forward communication control packets and user packets subsequently received from the user terminal to said particular gateway, wherein said response packet to be forwarded to the user terminal is selected from among said plurality of response packets according to the connection load status information stored in said load distribution management table, wherein the connection load status information stored in said load distribution management table includes an operation priority indicating the operation mode of each of said gateways, and wherein said protocol processing unit selects said particular gateway from among a plurality of gateways each having the first level of operation priority.

6. The packet forwarding apparatus according to claim 5, wherein:

said protocol processing unit selects, when the number of connections has reached the maximum number of connections for all the gateways having the first level of operation priority in said load distribution management table, said particular gateway from among a plurality of gateways each having the second level of operation priority.

7. A packet forwarding apparatus being located between a plurality of user terminals and a plurality of redundant gateways connected to a transit network for the Internet, the packet forwarding apparatus comprising:

a plurality of line interfaces each for communicating with one of said user terminals or one of said redundant gateways through connection lines; and a protocol processing unit for controlling forwarding of user packets and communication control packets among said plurality of line interfaces, said protocol processing unit having a load distribution management table for storing connection load status information of each of said redundant gateways in association with an identifier of the gateway, wherein said protocol processing unit is configured to receive a connection initiation request packet transmitted from one of said user terminals to connect the user terminal to said transit network, forward the connection initiation request packet to said plurality of redundant gateways, receive a plurality of response packets replied from said redundant gateways in response to the connection initiation request packet within a predetermined period of time, forward only one response packet transmitted from particular one of said redundant gateways to the user terminal which is the source of said connection initiation request packet, and forward communication control packets and user packets subsequently received from the user terminal to said particular gateway, wherein said response packet to be forwarded to the user terminal is selected from among said plurality of response packets according to the connection load status information stored in said load distribution management table, wherein the protocol processing unit is provided with a multi-connection management table for indicating, in association with an identifier of each of said user terminals, the maximum number of connections allowed in advance to each of said user terminals and the number of existing connections the user terminal has at present; and wherein said protocol processing unit refers to said multi-connection management table when said connection initiation request packet was received, discards the connection initiation request packet if the number of existing connections of a user terminal which is the source of the connection initiation request packet has reached the maximum number of connections in the multi-connection management, forwards the connection initiation request packet to said redundant gateways and updates the number of existing connections of the user terminal if the number of existing connections of the user terminal is less than the maximum number of connections in the multi-connection management.

8. A packet forwarding apparatus being located between a plurality of user terminals and a plurality of redundant gateways connected to a transit network for the Internet, the packet forwarding apparatus comprising:

a plurality of line interfaces each for communicating with one of said user terminals or one of said redundant gateways through connection lines; and a protocol processing unit for controlling forwarding of user packets and communication control packets among said plurality of line interfaces, said protocol processing unit having a load distribution management table for storing connection load status information of each of said redundant gateways in association with an identifier of the gateway, wherein said protocol processing unit is configured to receive a connection initiation request packet transmitted from one of said user terminals to connect the user terminal to said transit network, forward the connection initiation request packet to said plurality of redundant gateways, receive a plurality of response packets replied from said redundant gateways in response to the connection initiation request packet within a predetermined period of time, forward only one response packet transmitted from particular one of said redundant gateways to the user terminal which is the source of said connection initiation request packet, and forward communication control packets and user packets subsequently received from the user terminal to said particular gateway, wherein said response packet to be forwarded to the user terminal is selected from among said plurality of response packets according to the connection load status information stored in said load distribution management table, wherein the protocol processing unit comprises a routing unit connected to said plurality of line interfaces and a control processor coupled to the routing unit, wherein the routing unit forwards communication control packets received from said line interfaces to the control processor, wherein the control processor selects said particular gateway by referring to said load distribution management table, and wherein the routing unit routes each of user packets received from said line interfaces and communication control packets received from the control processor to any of the line interfaces according to header information of the received packet.

9. The packet forwarding apparatus according to claim 8, wherein:

said routing unit is provided with a monitor target packet table for previously designating the type of communication control packets to be monitored, discriminates the type of communication control packets received from each of said line interfaces, forwards only communication control packets specified as monitor targets in said monitor target packet table to the control processor, and routes communication control packets not specified in the monitor target packet table to any of the line interfaces according to header information of each of the communication control packets.

* * * * *